(12) United States Patent
Honda et al.

(10) Patent No.: US 10,985,637 B2
(45) Date of Patent: Apr. 20, 2021

(54) LAMINATED CORE MANUFACTURING METHOD

(71) Applicant: Nidec Corporation, Kyoto (JP)

(72) Inventors: Takeshi Honda, Kyoto (JP); Hiroshi Kitagaki, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 211 days.

(21) Appl. No.: 16/325,199

(22) PCT Filed: Sep. 22, 2017

(86) PCT No.: PCT/JP2017/034191
§ 371 (c)(1),
(2) Date: Feb. 13, 2019

(87) PCT Pub. No.: WO2018/062003
PCT Pub. Date: Apr. 5, 2018

(65) Prior Publication Data
US 2019/0173363 A1    Jun. 6, 2019

(30) Foreign Application Priority Data

Sep. 30, 2016  (JP) .............................. JP2016-194145

(51) Int. Cl.
*H02K 15/00*   (2006.01)
*H02K 15/02*   (2006.01)
*H02K 1/18*    (2006.01)
*H02K 1/14*    (2006.01)

(52) U.S. Cl.
CPC ............. *H02K 15/022* (2013.01); *H02K 1/18* (2013.01); *H02K 15/02* (2013.01); *H02K 1/148* (2013.01); *H02K 2201/09* (2013.01); *Y10T 29/49009* (2015.01); *Y10T 29/49069* (2015.01)

(58) Field of Classification Search
USPC .......... 29/596, 598, 604, 606, 609, 732, 738
See application file for complete search history.

(56) References Cited

U.S. PATENT DOCUMENTS 7,667,367 B2 *   2/2010   Matsuo ............... H02K 15/022
                                                  310/216.008
10,630,153 B2 *  4/2020   Hasuo .................... H02K 1/06

FOREIGN PATENT DOCUMENTS

JP          2005-318763 A      11/2005

OTHER PUBLICATIONS

Official Communication issued in International Patent Application No. PCT/JP2017/034191, dated Dec. 19, 2017.

* cited by examiner

*Primary Examiner* — Thiem D Phan
(74) *Attorney, Agent, or Firm* — Keating & Bennett

(57) ABSTRACT

A laminated core manufacturing method includes punching a center hole in a processing region, molding split stator piece portions adjacently in a circumferential direction, and pushing back and molding the split stator piece portions. In the molding the split stator piece portions, the split stator piece portion is extruded in parallel with the workpiece.

11 Claims, 28 Drawing Sheets

LAMINATED CORE MANUFACTURING METHOD

BACKGROUND OF THE INVENTION

1. Field of the Invention

The present disclosure relates to a laminated core manufacturing method.

2. Description of the Related Art

In a conventional electric motor, a laminated iron core is used as a stator. A method for manufacturing a laminated iron core is disclosed in Japanese Laid-Open Patent Publication No. 2005-318763, for example. In the method for manufacturing a laminated iron core disclosed in Japanese Laid-Open Patent Publication No. 2005-318763, after rotor core pieces are punched from a thin sheet material, in a yoke portion formation region in which split iron core pieces are connected to each other, the connecting portions of the split iron core pieces, adjacent to each other, are sheared and separated and also bent. Then, pushback is performed to push back the bent portion. Then, a predetermined number of slots are punched from the thin plate material. Further, after the split iron core pieces are separated and formed by punching the inner diameter and the outer diameter, the split iron core pieces are caulked to the lower split iron core. The laminated iron core is manufactured through the steps as described above.

In the method for manufacturing a laminated iron core described in Japanese Laid-Open Patent Publication No. 2005-318763, the connecting portion of a split iron core piece is sheared and then bent, and then pushed back. Once a metal plate used for a laminated iron core is bent, it does not return to its original shape even if it is pushed back. Therefore, the roundness of the laminated iron core may be lowered.

Also, in the vicinity of the bent portion of a split iron core piece, the dimensional accuracy is lowered, so that it is not suitable for caulking. For this reason, the portion to be caulked is limited.

Furthermore, in the bent portion generated by bending, the metallic property may be changed, which causes a change in the flow of the magnetic flux. There is a possibility that the magnetic characteristics of the laminated iron core may vary due to the restriction of the portion to be caulked and the change in the metallic property at the bent portion.

SUMMARY OF THE INVENTION

An exemplary laminated core manufacturing method according to the present disclosure includes a center hole punching step of punching a center hole including a center axis from a center portion of a processing region provided in a workpiece, the processing region including a yoke piece formation region in which the yoke piece is formed and a tooth piece formation region in which the tooth piece is formed; a split stator piece portion molding step of extruding the yoke piece formation region and the tooth piece formation region in a thickness direction of the workpiece in a shape that is the same as a shape of the split stator piece, and molding a predetermined number of the split stator piece portions adjacently arranged in the circumferential direction around the center axis; a pushback step of pushing back and molding the split stator piece portion extruded in the split stator piece portion molding step, a contour punching step of punching a contour of a portion that is molded in the workpiece and becomes the stator piece; and a lamination step of laminating, in the axial direction, and connecting the split yoke pieces and the tooth pieces. In the split stator piece portion molding step, the split stator piece portion is extruded in parallel with the workpiece.

According to the exemplary laminated core manufacturing method of the present disclosure, variations in the shape accuracy and the magnetic characteristics of the laminated core are able to be reduced or prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A motor according to exemplary embodiments of the present invention will be described below with reference to the drawings. Note that the scope of the present invention is not limited to the embodiments described below, but includes any modification thereof within the scope of the technical idea of the present invention. Also note that scales, numbers, and the like of structures illustrated in the following drawings may differ from those of actual structures, for the sake of easier understanding of the configurations.

In the accompanying drawings, an xyz coordinate system is shown appropriately as a three-dimensional orthogonal coordinate system. In the xyz coordinate system, a z-axis direction is assumed to be a direction parallel to a center axis C1 shown in FIG. 1. An x-axis direction is assumed to be a direction orthogonal to the z-axis direction and along the sheet surface in FIG. 1. A y-axis direction is assumed to be a direction orthogonal to both the x-axis direction and the z-axis direction.

Figure 1:
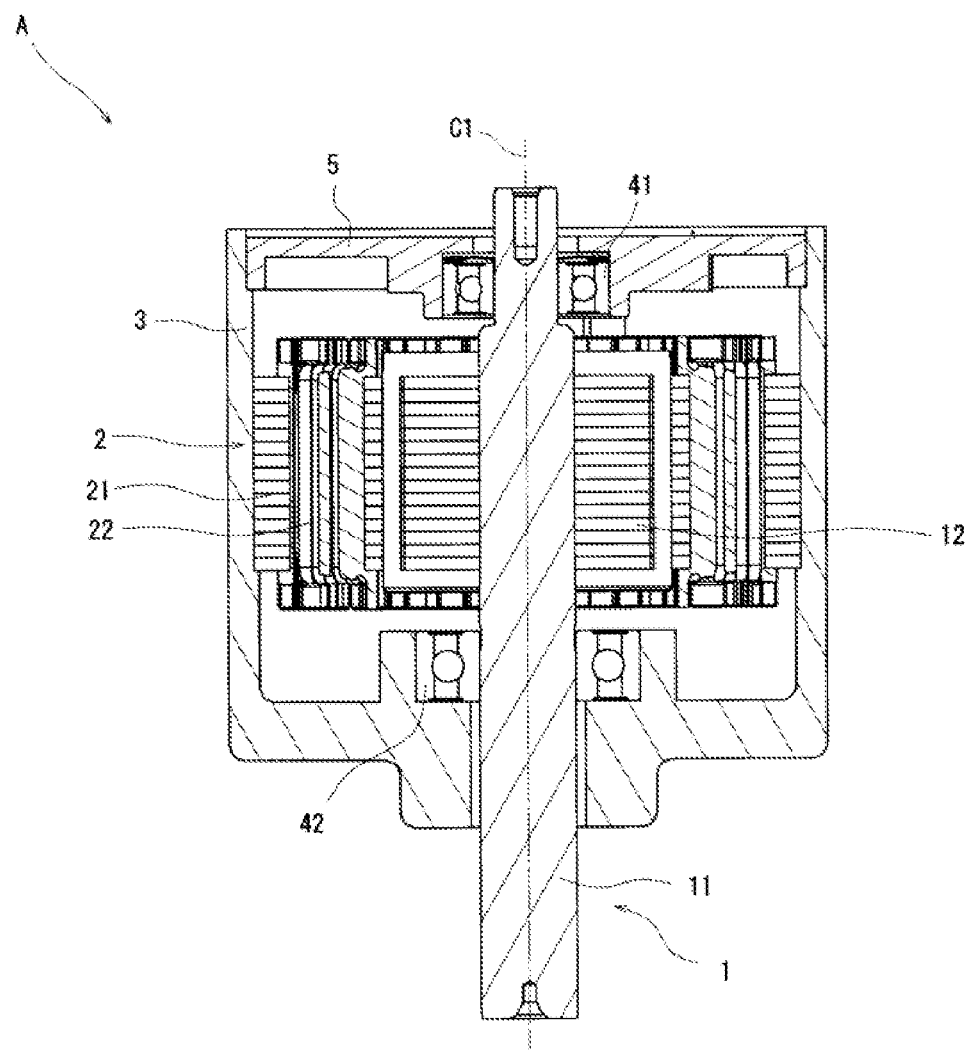
FIG. 1 is a cross-sectional view of a motor.
Figure 1:
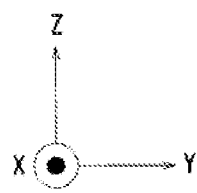

In the state shown in FIG. 1, the z-axis is defined that the upper side is the positive side (+z side) and the lower side is the negative side (−z side). The positive side (+Z side) of the z-axis direction is referred to as 'one side' and the negative side (−z side) of the z-axis direction is referred to as 'the other side'. It should be noted, however, that the above definitions of the one side and the other side are simply referred to for the sake of convenience in description, and do not restrict actual relative positions or directions. Also, unless otherwise explained, a direction (z-axis direction) parallel to the center axis C1 is simply referred to as an 'axial direction', a radial direction having its center on the center axis C1 is simply referred to as a 'radial direction', and a direction along the arc direction about the center axis C1, that is, a circumferential direction of the center axis C1, is simply referred to as a 'circumferential direction'.

1. First Embodiment

<1.1 Schematic Configuration of Motor>

A schematic configuration of a motor according to a first embodiment of the present invention as an example will be described. FIG. 1 is a cross-sectional view of a motor.

As shown in FIG. 1, the motor A has a rotor 1, a stator 2, a housing 3, a first bearing 41, and a second bearing 42. The motor A also has a bearing holding part 5 for holding the first bearing 41.

<1.2 Rotor>

The rotor 1 has a shaft 11 and a rotor core 12. The rotor 1 is relatively rotatable about the center axis C1 with respect to the stator 2.

The shaft 11 has a columnar shape extending in the axial direction (z-axis direction). The shaft 11 is rotatably supported by the housing 3 via the first bearing 41 and the second bearing 42. Thereby, the rotor 1 is rotatable with respect to the stator 2 about the center axis C1. The shaft 11 is fixed to the rotor core 12 by press fitting. Note that the fixing of the shaft 11 and the rotor core 12 is not limited to press fitting. A method capable of fixing the shaft 11 and the rotor core 12 to each other can be widely adoptable.

The rotor core 12 is a laminated body in which electromagnetic steel sheets are laminated. A magnet (not shown) is attached to the rotor core 12. The rotor core 12 is excited by the magnet.

<1.3 Housing>

The housing 3 is tubular extending in the axial direction. The stator 2 is fixed to an inner peripheral surface of the housing 3. The stator 2 is fixed to the inside of the housing, so that it shares the center axis (center axis C1) with the housing 3.

<1.4 Bearing>

The shaft 11, described below, of the rotor 1 is rotatably supported by the first bearing 41, and the other side is rotatably supported by the second bearing 42, respectively. That is, the rotor 1 is rotatably supported by the first bearing 41 and the second bearing 42.

Here, the first bearing 41 and the second bearing 42 are ball bearings. The shaft 11 is rotatably supported by the housing 3 via the first bearing 41 and the second bearing 42. Here, the center axis of the shaft 11 coincides with the center axis C1 of the housing 3.

The first bearing 41 is fixed to the bearing holding part 5 which closes an opening of an end portion on the one side in the axial direction of the housing 3. Further, the second bearing 42 is fixed to a bottom portion of the end portion on the other side in the axial direction of the housing 3.

<1.5 Stator>

The stator 2 surrounds the radially outer side of the rotor 1. The stator 2 and the rotor 1 share the center axis. The stator 2 includes a stator core 21 and coils 22. The stator 2 faces the rotor 1 and includes a plurality of coils 22.

<1.5.1 Stator Core>

Figure 2:
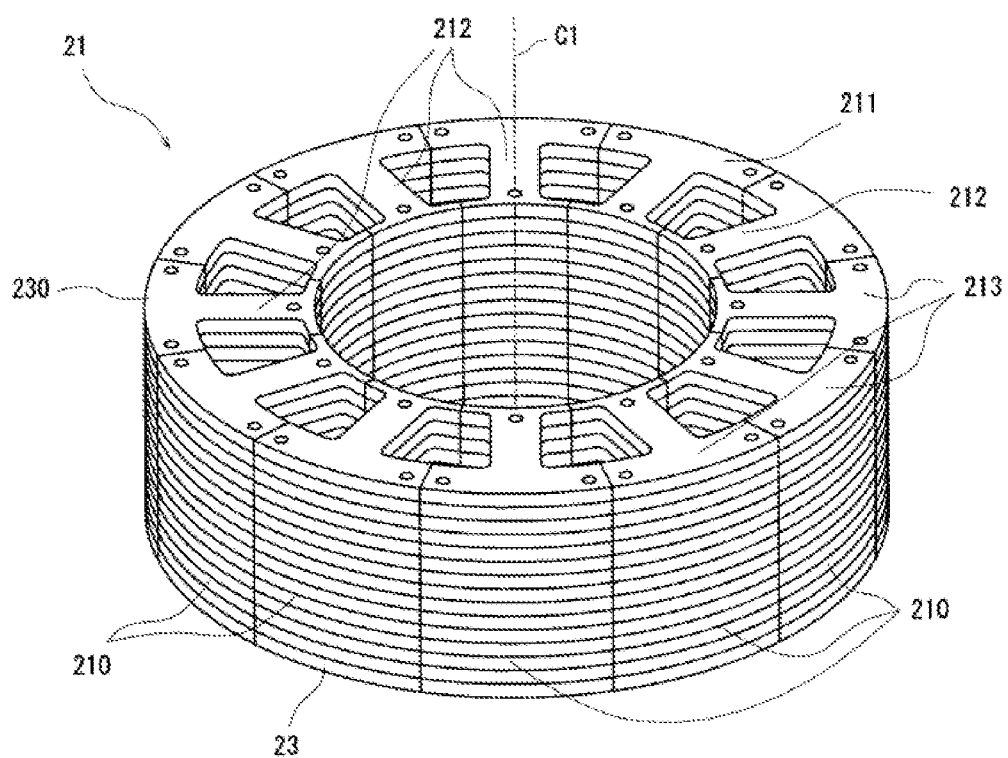
FIG. 2 is a perspective view of a stator core.
Figure 3:
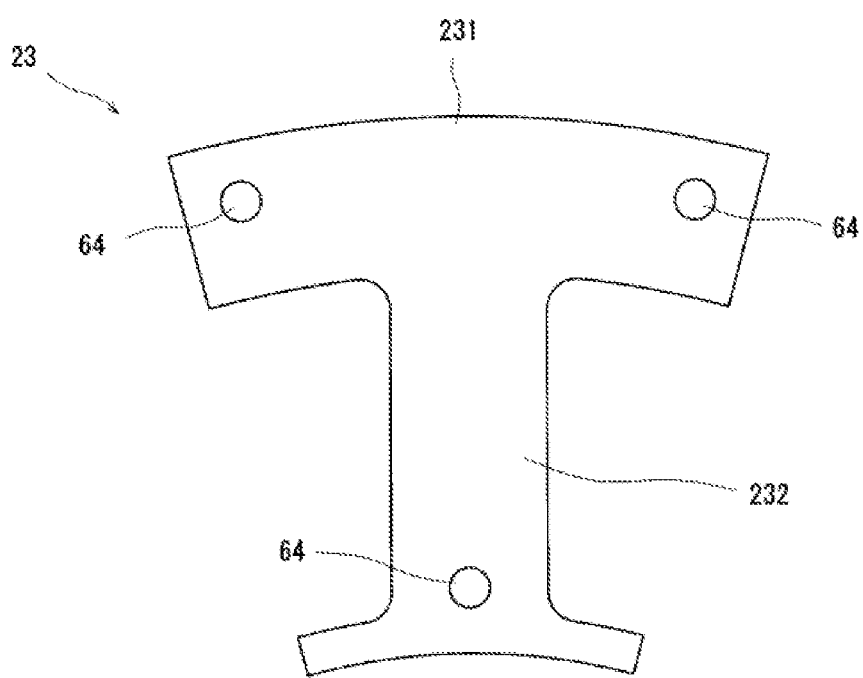
FIG. 3 is a plan view of a split stator piece.

FIG. 2 is a perspective view of a stator core. FIG. 3 is a plan view of a split stator piece. As shown in FIG. 2, the stator core 21 includes an annular yoke 211 and teeth 212 extending radially inward from the yoke 211. Further, the stator core 21 is split into twelve split stators 210 in the circumferential direction.

The split stator 210 has a split yoke 213 in which annular yoke 211 is split in the circumferential direction. From each split yoke 213 of each of the split stators 210, the tooth 212 extends radially inward.

The split stator 210 is a laminated body in which a plurality of split stator pieces 23 are laminated. The split stator piece 23 includes a predetermined number of (twelve in this case) split yoke pieces 231 constituting an annular yoke piece 2301 (see FIG. 14 to be described later) by being connected in the circumferential direction of the center axis C1, and tooth pieces 232 continuously formed of the same material as that of the split yoke piece 231 and extending radially inward of the yoke piece 2301. In addition, caulking portions 64 are provided at both circumferential end portions of the split yoke piece 231 and an end portion on the radially inner side of the tooth piece 232.

Twelve split stators 210 are connected endlessly in the circumferential direction to constitute the stator core 21. Further, the split stator pieces 23 are connected endlessly to form the stator piece 230. In other words, twelve split stator pieces 23 are connected endlessly in the circumferential direction and are laminated in the axial direction to thereby constitute the stator core 21. That is, the stator core 21 is a laminated core.

The coil 22 is formed by winding a conductive wire around the outer periphery of the insulator covering the outer surface of the teeth 212 of the stator core 21. An end portion of the conductive wire is drawn out to the coil 22, and the end portion of the conductive wire extends from an end portion on the one side in the axial direction of the stator 2 to the one side in the axial direction. With the electric power supplied to the coil 22 via the conductive wire, the stator 21 is excited. For example, the coil 22 of the motor A is divided into three phases (U, V, W). Then, a current having a sinusoidal waveform shifted in phase is supplied to each phase. Therefore, a number of conductive wires sufficient for supplying electric current to the respective three phases are provided.

<2. Laminated Core Manufacturing Method>

Figure 4:
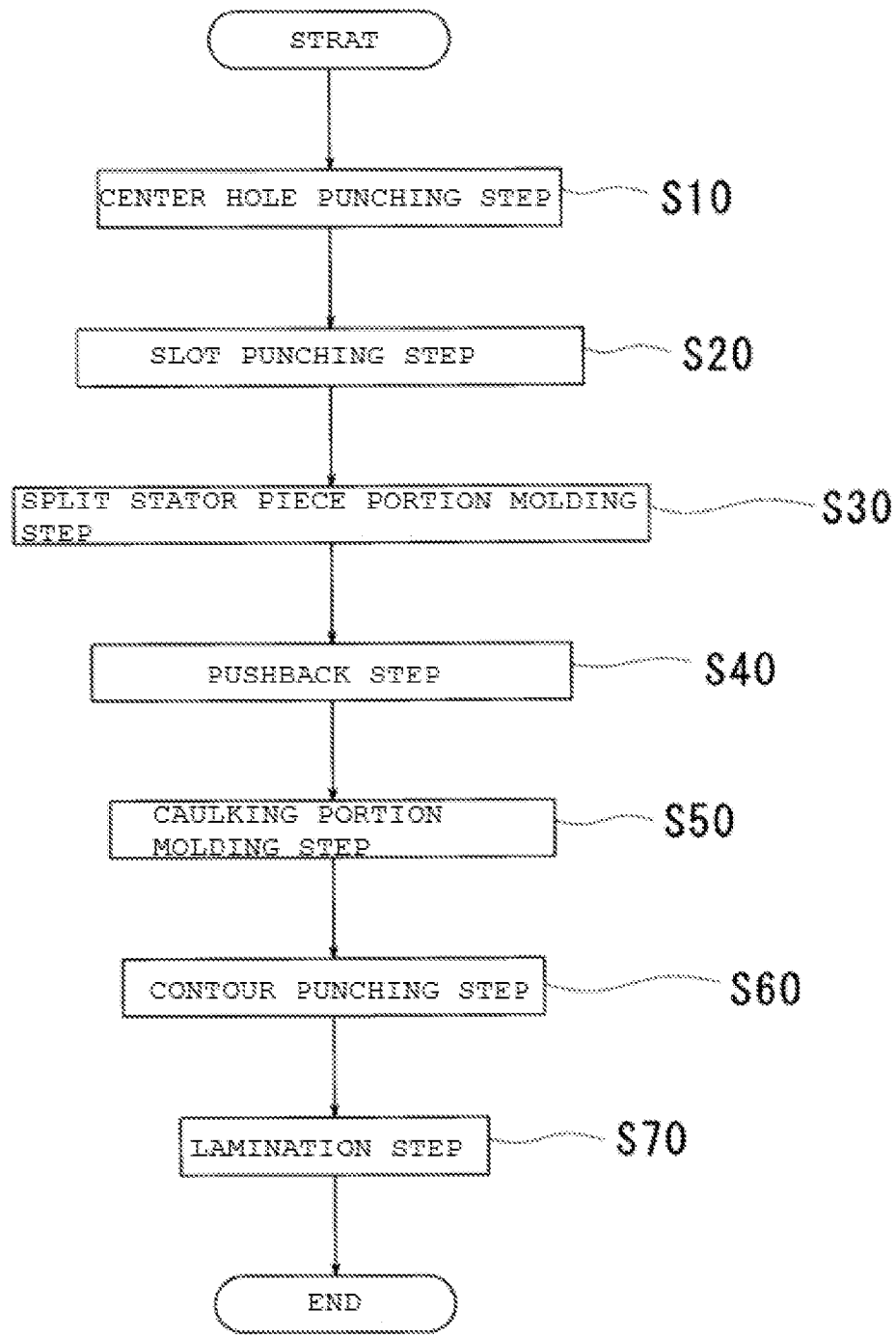
FIG. 4 is a flowchart showing a laminated core manufacturing method according to a first embodiment of the present invention as an example.

A laminated core manufacturing method for producing the aforementioned stator core will be described with reference to the drawings. FIG. 4 is a flowchart showing a laminated core manufacturing method according to the first embodiment of the present invention as an example. FIGS. 5 to 15 are diagrams each showing a part of each step in a motor manufacturing method shown in FIG. 4. In the laminated core manufacturing method, an alternate long and short dashed line indicates a boundary to be processed subsequently. For example, in the case of performing press working, it is a line indicating a position where a tool for press working is disposed.

As shown in FIG. 4, the laminated core manufacturing method for the present embodiment includes a center hole punching step S10, a slot punching step S20, a split stator piece portion molding step S30, a pushback step S40, a caulking portion molding step S50, a contour punching step S60, and a lamination step S70.

<2.1 Center Hole Punching Step>

Figure 5:
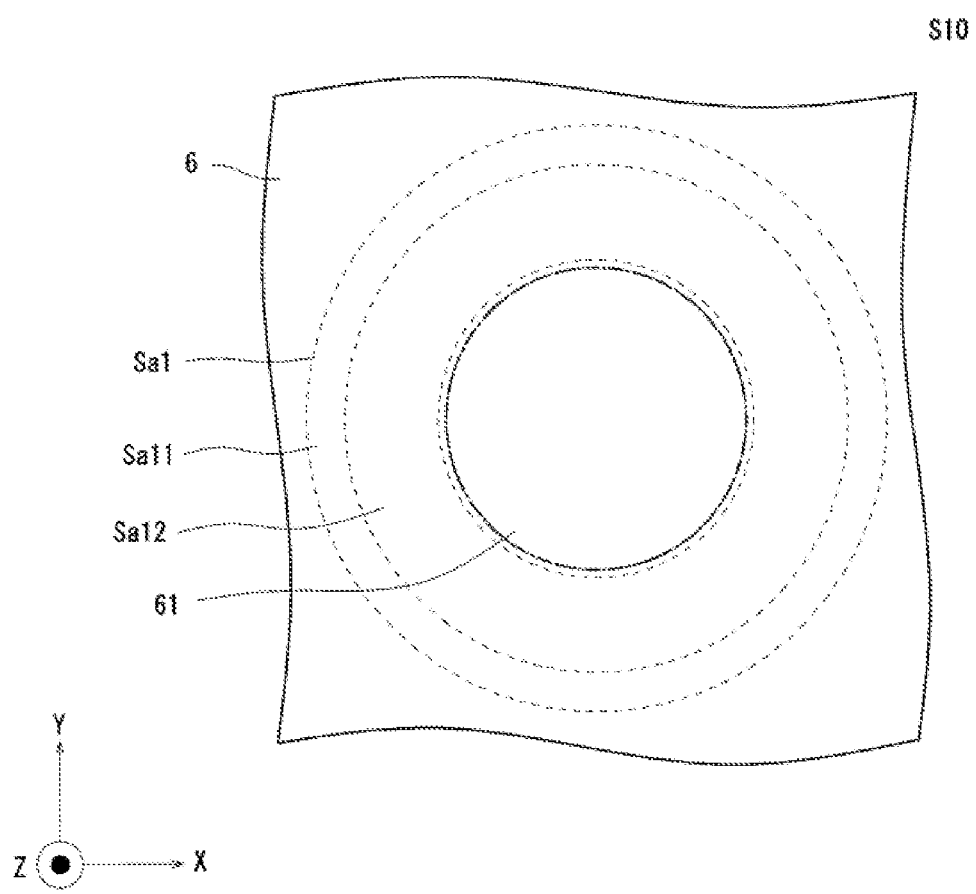
FIG. 5 is a diagram showing a part of a center hole punching step.

FIG. 5 is a diagram showing a part of the center hole punching step. As shown in FIG. 5, a processing region Sa1 of a workpiece 6 that is an electromagnetic steel sheet, that is, a magnetic material, has an annular yoke piece formation region Sa11 and an annular tooth piece formation region Sa12. The yoke piece formation region Sa11 and the tooth piece formation region Sa12 share the center axis.

As shown in FIG. 5, in the center hole punching step S10, a circular center hole 61 is punched inside the tooth piece formation region Sa12 of the workpiece 6. The center hole punching step S10 is performed by press working. The center hole 61 has an inner diameter smaller than the inner diameter of a cylindrical portion provided at the center of the stator core 21. However, the present invention is not limited to this. The center hole 61 may have an inner diameter that is the same as the inner diameter of the cylindrical shape at the center of the stator core 21. Further, the center hole 61 is not limited to a circular shape. It may be a polygonal shape having the same pieces as those of the split stator pieces 23. That is, in the center hole punching step S10, the center hole 61 including the center axis C1 is punched from a center portion of the processing region Sa1 including the yoke piece formation region Sa11 where the yoke piece 2301 is to be formed and the tooth piece formation region Sa12 where the tooth piece 232 is to be formed provided in the workpiece 6.

When the center hole 61 is punched in the center hole punching step S10, the inner portion of the center hole 61 is a plate material having the same shape as the center hole 61. Instead of discarding this plate material as it is, a constituting piece of the rotor core 12 may be punched. That is, the center hole punching step S10 may include a step of punching a constituting piece of the rotor core 12 rotatably arranged inside the stator core 21.

<2.2 Slot Punching Step>

Figure 6:
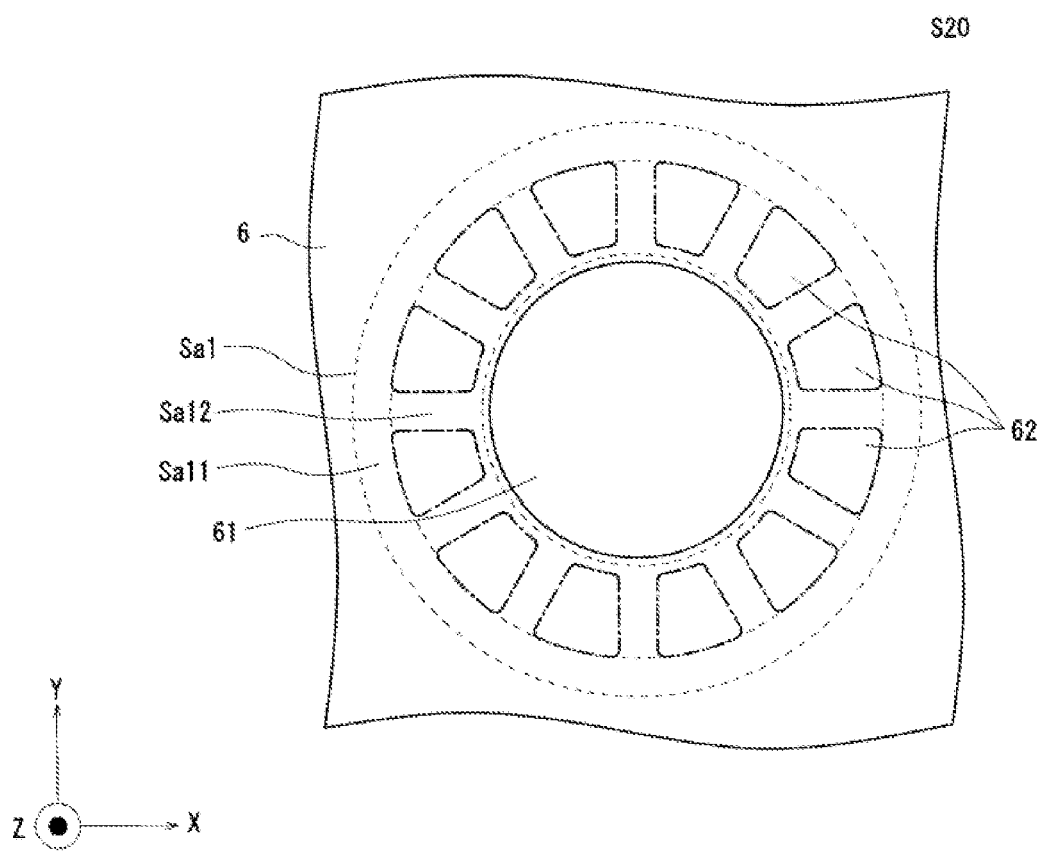
FIG. 6 is a diagram showing a part of a slot punching step.

FIG. 6 is a diagram showing a part of the slot punching step. In the slot punching step S20, slots 62 aligned in the circumferential direction are punched in the tooth piece formation region Sa12 on the radially outer side of the center hole 61. Twelve slots 62 are provided in the circumferential direction. The slot 62 has a radially outer circumferential length longer than a radially inner circumferential length. In the slot punching step S20 of the present embodiment, a slot 62 of an isosceles trapezoid with rounded corners is punched out. In the slot 62, a conductive wire is disposed. When the slot 62 is formed, the tooth piece portion 632 that becomes a tooth piece is formed. That is, the slot punching step S20 punches the slots 62 adjacent to each other in the circumferential direction of the tooth piece portion 632 in the tooth piece formation region Sa12. The slot punching step S20 is performed before the split stator piece portion molding step S30.

<2.3 Split Stator Piece Portion Molding Step>

Figure 7:
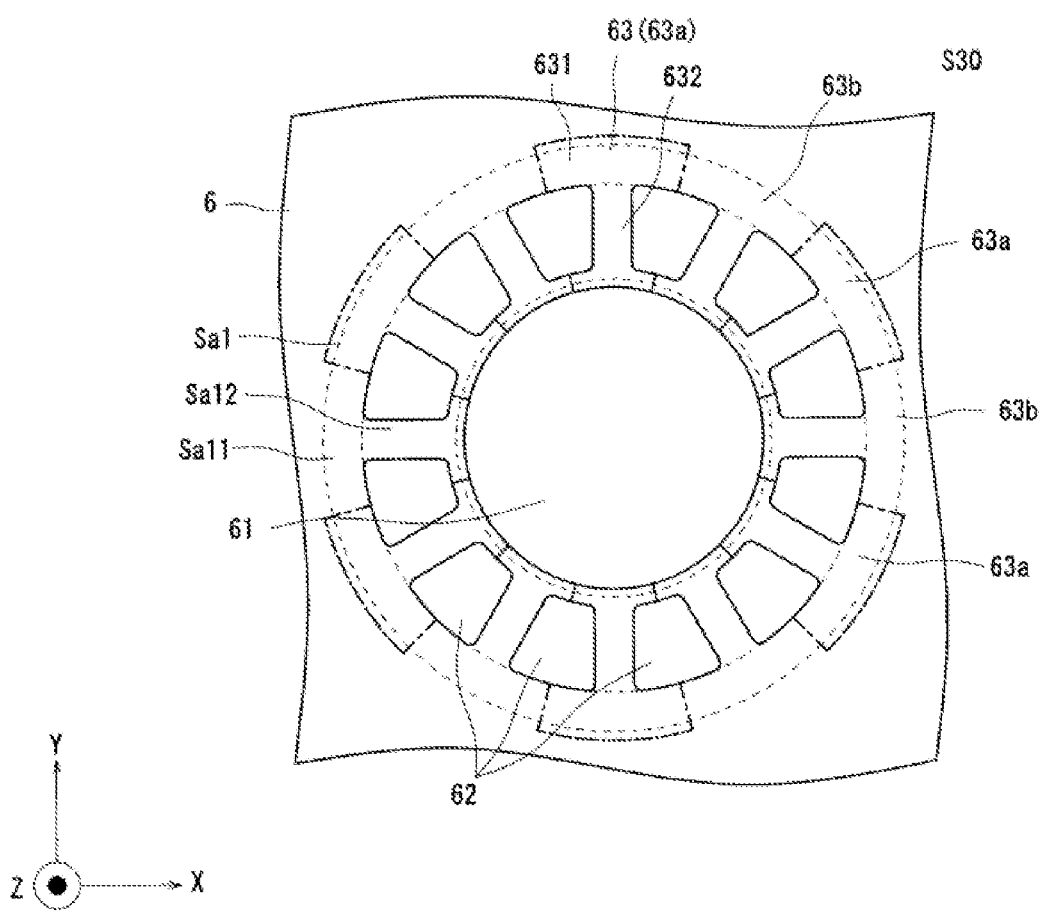
FIG. 7 is a diagram showing a part of a split stator piece portion molding step.
Figure 8:
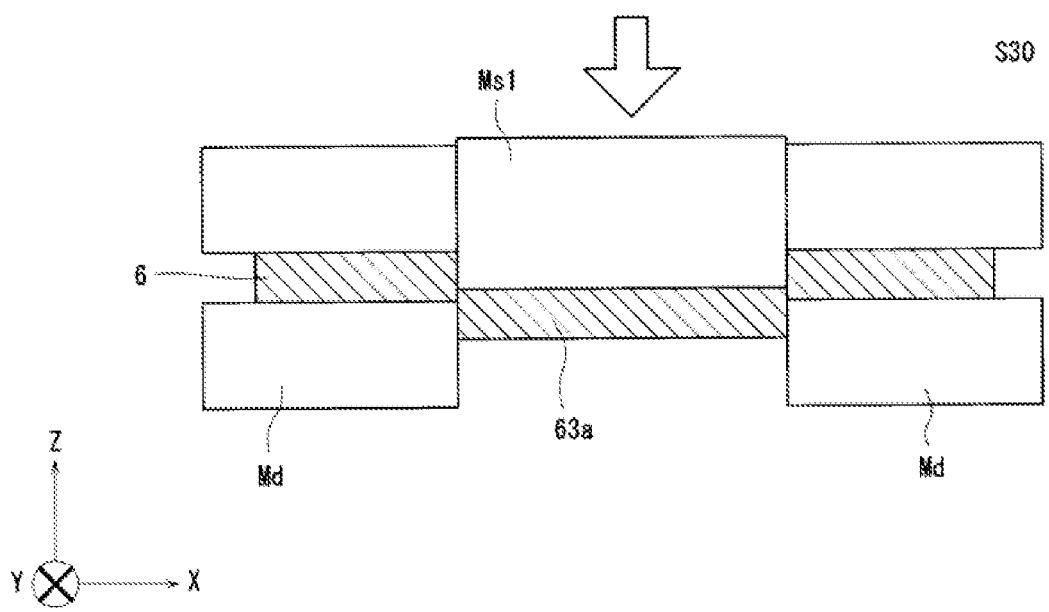
FIG. 8 is a cross-sectional view showing a processing state in the split stator piece portion molding step.

FIG. 7 is a diagram showing a part of the split stator piece portion molding step. FIG. 8 is a cross-sectional view showing a processing state in the split stator piece portion molding step. As shown in FIG. 7, the split stator piece portion molding step S30 is a step of molding the split stator piece portion 63 that becomes the split stator piece 23, in the processing region Sa1 of the workpiece 6. The split stator piece portions 63 are arranged side by side in the circumferential direction, and each includes a split yoke piece portion 631 that becomes a split yoke piece 231 and a tooth piece portion 632 that becomes a tooth piece 232. As shown in FIG. 8, in the split stator piece portion molding step S30, the workpiece 6 is held by a mold Md, and a tool Ms1 (blade) is moved in the axial direction to extrude the workpiece 6. That is, in the split stator piece portion molding step S30, the yoke piece formation region Sa11 and the tooth piece formation region Sa12 are extruded in the thickness direction of the workpiece 6 in the same shape as a split stator piece, to thereby mold a predetermined number of split stator piece portions 63 arranged adjacently in the circumferential direction around the center axis C1.

In the split stator piece portion molding step S30, the split stator piece portion 63 has an extruded portion 63a extruded by the tool Ms1 and a stationary portion 63b that is not extruded. As shown in FIG. 8, in the split stator piece portion molding step S30, the extruded portion 63a and the stationary portion 63b are alternately arranged in the circumferential direction. In the present embodiment, since the number of split stator piece portions is an even number, it is possible to arrange the extruded portion 63a and the stationary portion 63b alternately. In other words, the predetermined number is an even number, and in the split stator piece portion molding step S30, the predetermined number of extruded portion 63a circumferentially arranged in the circumferential direction are alternately extruded. In the present embodiment, the extruded portion 63*a* is extruded to such an extent that it is not separated from the workpiece 6. However, it is not limited thereto and it may be separated.

As shown in FIG. 8, a portion of the tool Ms1, used in the split stator piece portion molding step S30, to be in contact with the workpiece 6 has a flat surface. In other words, the extruded portion 63*a* is extruded with the tool Ms1 kept parallel or substantially parallel to the other portions of the workpiece 6. That is, in the split stator piece portion molding step S30, the split stator piece portion 63 is extruded in parallel with the workpiece 6.

The radially outer side of the extruded portion 63*a* extruded in the split stator piece portion molding step S30 is the radially outer side of the yoke piece formation region Sa11. Further, the radially inner side of the extruded portion 63*a* reaches the center hole 61. In the present embodiment, in the split stator piece portion molding step S30, two or more split stator piece portions 63 may be formed by being extruded simultaneously. Further, in the split stator piece portion molding step S30, two or more split stator piece portions 63 may be extruded one by one.

<2.4 Pushback Step>

Figure 9:
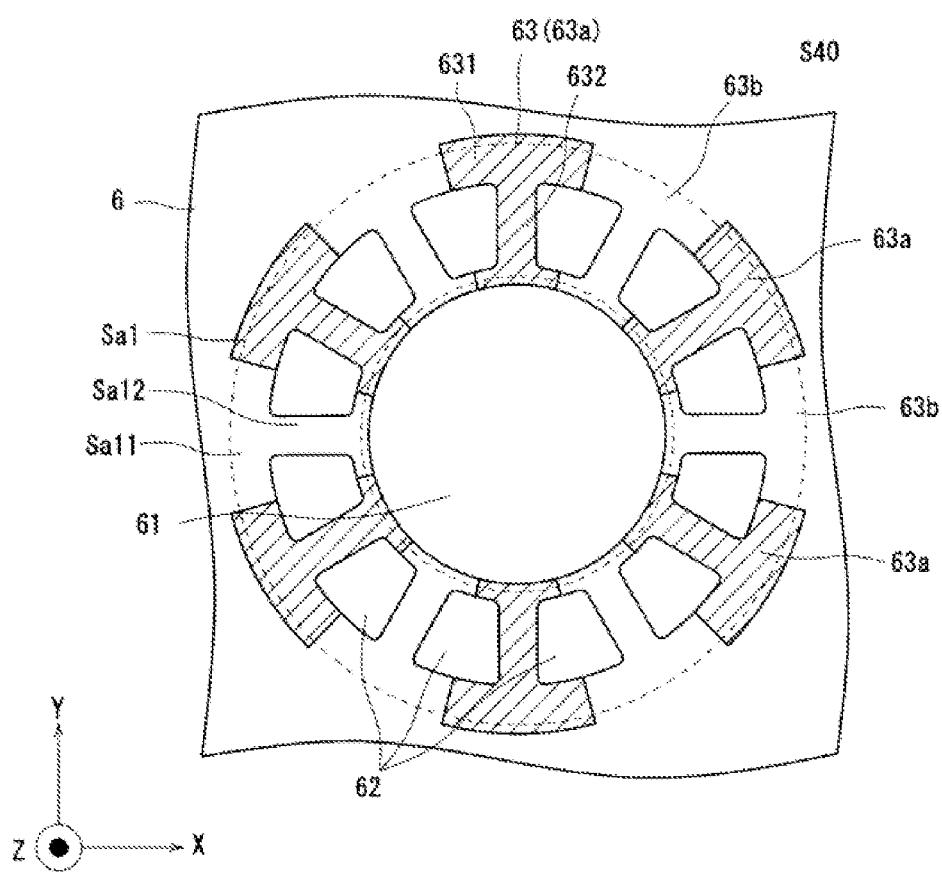
FIG. 9 is a diagram showing a part of a pushback step.
Figure 10:
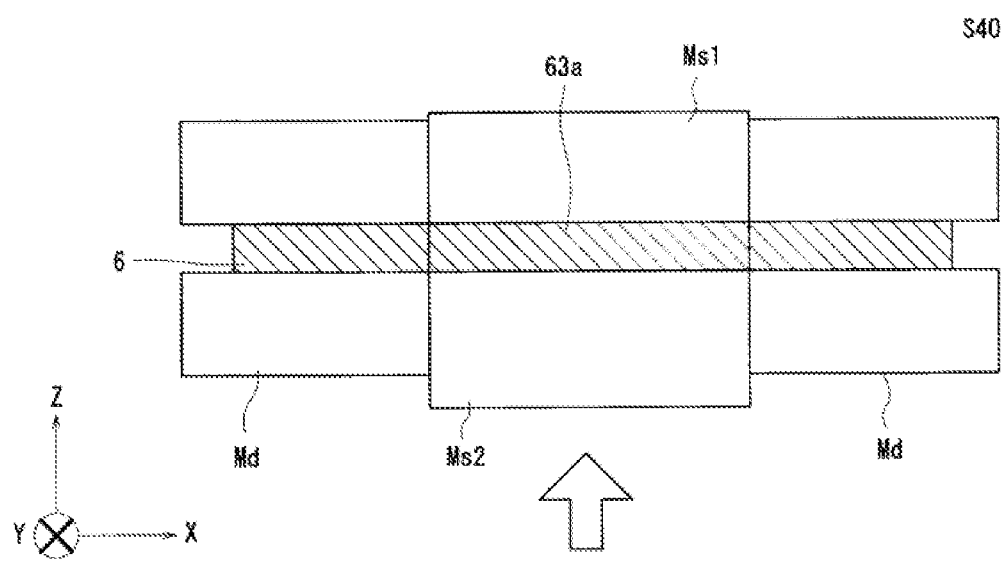
FIG. 10 is a cross-sectional view showing a processing state in the pushback step.

FIG. 9 is a diagram showing a part of the pushback step. FIG. 10 is a cross-sectional view showing a processing state in the pushback step. In FIG. 9, the portions to be pushed back, of the workpiece, are hatched.

In the pushback step S40, a push-up tool Ms2 disposed to face the tool Ms1 pushes back the extruded portion 63*a* in a direction opposite to the direction projecting from the workpiece 6. Then, the extruded portion 63*a* is pushed back to the original position of the workpiece 6. That is, in the pushback step S40, the extruded portion 63*a* extruded in the split stator piece portion molding step S30 is pushed back and molded.

In this way, in the processing region Sa1 of the workpiece 6, the split stator piece portions 63 circumferentially arranged side by side on the radially outer side of the center hole 61 are formed. That is, in the yoke piece formation region Sa11, a groove is formed at the boundary between the extruded portion 63*a* and the stationary portion 63*b*.

In the present embodiment, in the pushback step S40, the extruded portion 63*a* may be returned in a state where the workpiece 6 is interposed between the tool Ms1 and the push-up tool Ms2. Further, the pushback step S40 may be performed in the same step as the split stator piece portion molding step S30.

In this embodiment, in the split stator piece portion molding step S30, the extruded portion 63*a* is extruded from the workpiece 6 while being kept in parallel with the workpiece 6. Also in the pushback step S40, the extruded portion 63*a* is pushed back to the original position while being kept in parallel with the workpiece 6.

That is, in the split stator piece portion molding step S30 and the pushback step S40, the split stator piece portions 63 are not bent during processing. Thus, it is possible to suppress occurrence of residual stress and residual strain in the split stator piece portions 63, that is, the split stator pieces 23, caused by processing. As a result, it is possible to increase the dimensional accuracy of the split stator pieces 23, that is, the stator core 21. In addition, since turbulence of the flow of the magnetic flux can be suppressed, deterioration in the magnetic characteristics of the stator core 21 can be suppressed. When the pushback step S40 is completed, the boundary between the extruded portion 63*a* and the stationary portion 63*b* of the split stator piece portion 63 may be separated. When split, the extruded portion 63*a* is held in the workpiece 6 by friction with another portion of the workpiece 6. Also, at least a part thereof may be connected. That is, in the split stator piece portion molding step S30 or the pushback step S40, the split stator piece portion 63 may be separated from the workpiece 6.

<2.5 Caulking Portion Molding Step>

Figure 11:
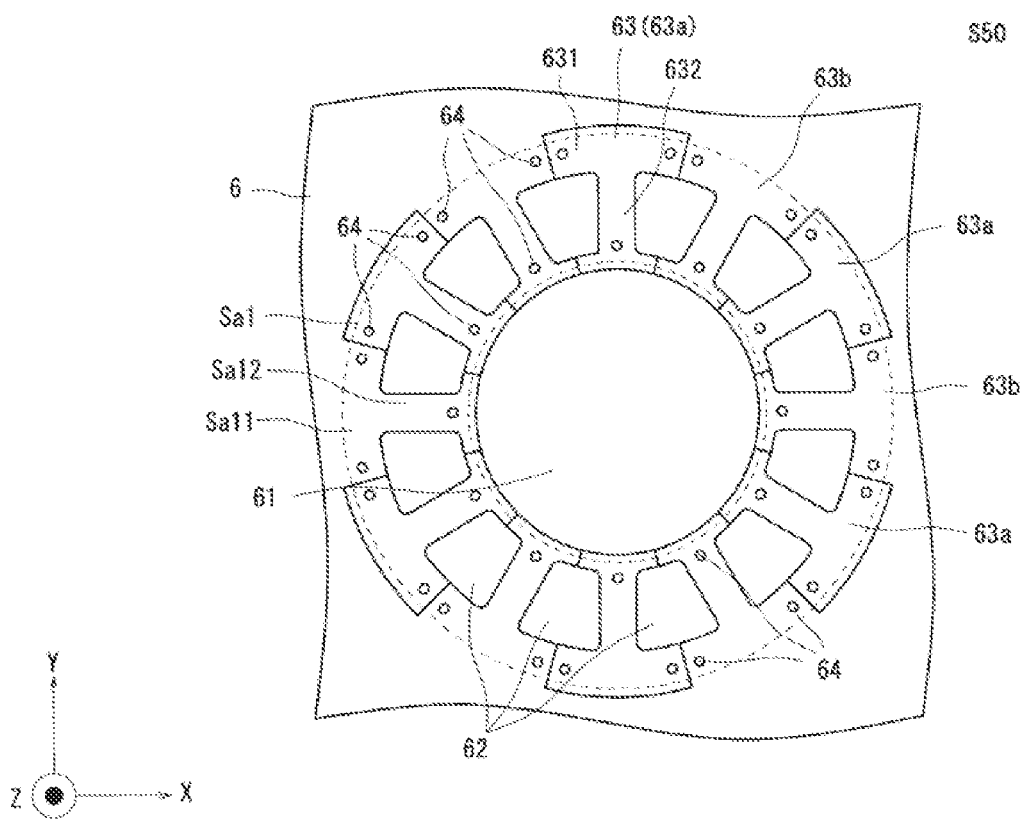
FIG. 11 is a diagram showing a part of a caulking portion molding step.
Figure 12:
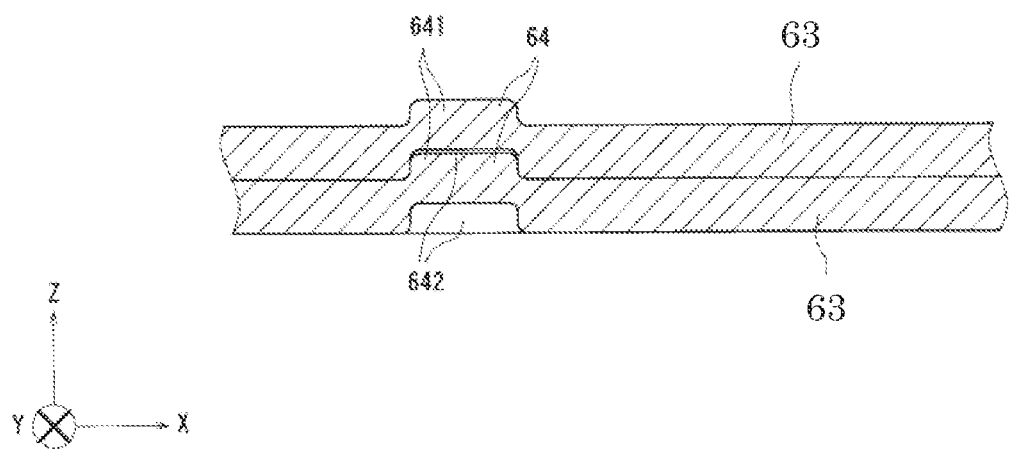
FIG. 12 is a cross-sectional view including a caulking portion provided to a split stator piece portion.

FIG. 11 is a diagram showing a part of the caulking portion molding step. FIG. 12 is a cross-sectional view including a caulking portion provided to the split stator piece portion. In the caulking portion molding step S50, a caulking portion 64 for fixing the split stator piece portions 63 to each other at the time of lamination is formed in the split stator piece portions 63. That is, in the caulking portion molding step S50, the caulking portion 64 is formed in at least one of the split yoke piece portion 631 and the tooth piece portion 632 of the split stator piece portion 63. Then, the caulking portion molding step S50 is performed in the previous stage of the contour punching step S60.

As shown in FIG. 12, the caulking portion 64 has a protruding portion 641 formed by extruding the split stator piece portion 63 toward the one side from the other side in the axial direction, and a recessed hole 642 provided on a surface of the other side in the axial direction. When the split stator piece portions 63 are laminated in the axial direction, the protruding portion 641 of the caulking portion 64 provided to the split stator piece portion 63 on the other side in the axial direction is fitted into the recessed hole 642 of the caulking portion 64 provided to the split stator piece portion 63 laminated on the one side in the axial direction. The split stator piece portion 63 is fixed by the frictional force between the protruding portion 641 of the caulking portion 64 and the recessed hole 642 of the caulking portion 64.

The caulking portion 64 remains on the split stator piece 23 even after the split stator piece 23 is molded. As shown in FIG. 12, the caulking portion 64 protrudes to the other side in the axial direction from the other portion of the split stator piece portion 63. Therefore, the flow of the magnetic flux is changed in the caulking portion 64 and its vicinity, which may adversely affect the magnetic characteristics of the stator core 21. Therefore, it is desirable that the caulking portion 64 is as small as possible.

When the positions and shapes of the caulking portions 64 vary in the split stator piece portions 63, in the state shown in FIG. 12, the protruding portion 641 on the other side in the axial direction may not be inserted into the recessed hole 642 on the one side in the axial direction, or even if it can be inserted, it may not be fixed. Therefore, it is required that the positions and shapes of the caulking portions 64 in the split stator piece portions 63 coincide with each other with high accuracy. As the caulking portion 64 is smaller, higher precision is required for the accuracy of the position and shape of the caulking portion 64. For example, when the caulking portion 64 is formed in a portion where residual stress and residual strain are generated, the shape and position of the caulking portion 64 may be deviated due to the influence of the residual stress and/or the residual strain.

In the split stator piece portion molding step S30 and the pushback step S40 of the present embodiment, residual stress and residual strain are unlikely to occur at the time of processing the extruded portion 63*a* of the split stator piece portion 63. Therefore, in the split stator piece portion 63, a region where the caulking portion 64 can be formed is wide. In other words, in the split stator piece portion 63 manufactured by the manufacturing method according to the present invention, the place where the caulking portion 64 is formed is less restricted. It is possible to provide the caulking portion 64 at a position where the flow of the magnetic flux in the split stator piece 23 is not disturbed or is less likely to be disturbed. Thereby, it is possible to manufacture the stator core 21 having desired magnetic characteristics.

<2.6 Contour Punching Step>

Figure 13:
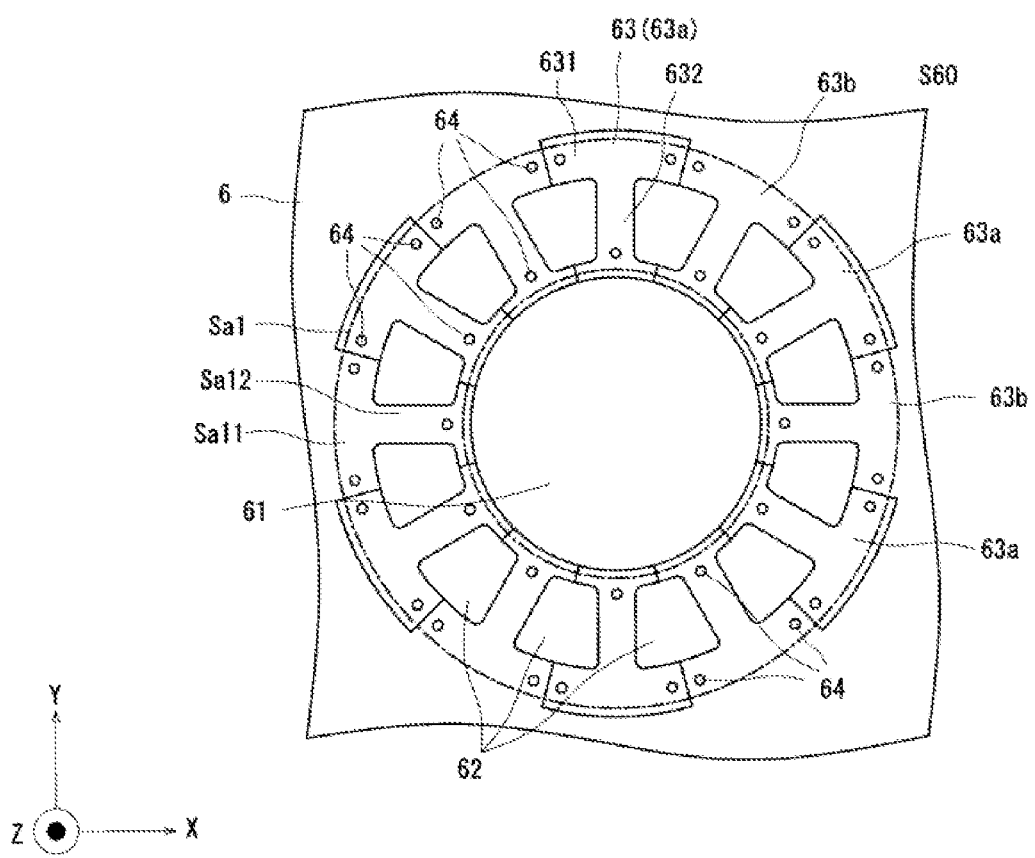
FIG. 13 is a diagram showing a part of a contour punching step.
Figure 14:
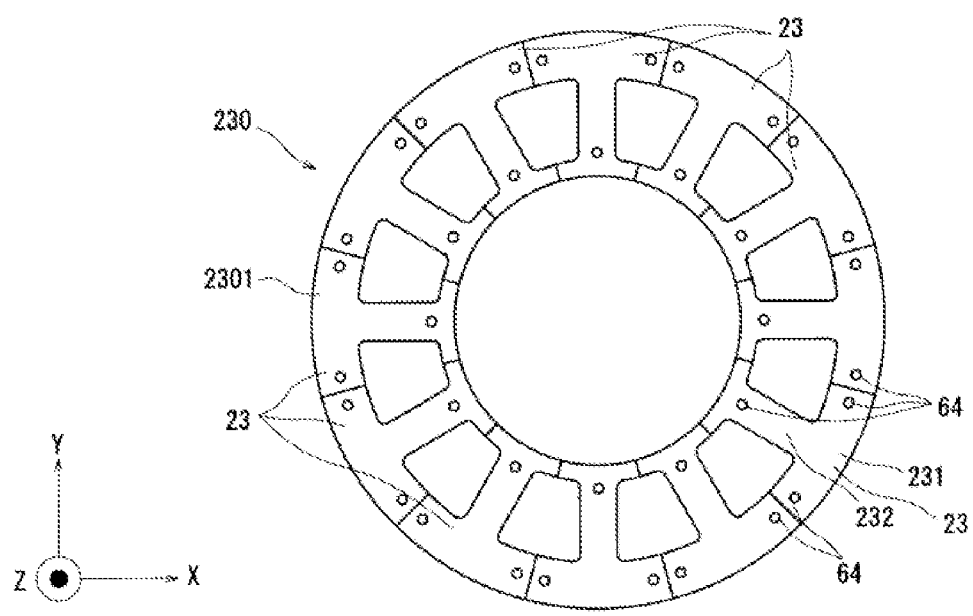
FIG. 14 is a plan view of a stator piece formed by a contour punching step.

FIG. 13 is a diagram showing a part of the contour punching step. FIG. 14 is a plan view of a stator piece formed by the contour punching step. As shown in FIG. 13, in the contour punching step S60, the radially inner side of the tooth piece portion 632 of the split stator piece portion 63 is cut into a circular shape having the same inner diameter as that of the cylinder inside the stator core 21. Further, the radially outer side of the split stator piece portion 63 is cut into a circular shape having the same inner diameter as that of the cylindrical shape outside the stator core 21. In other words, in the contour punching step S60, a tool (blade) is applied to the inner peripheral portion of the tooth piece formation region Sa12, and the inner side of the tooth piece formation region Sa12 is punched. Also, a tool (blade) having the same outer diameter as that of the yoke piece formation region Sa11 is applied to punch. That is, in the contour punching step S60, the contour of the portion 63 that becomes the stator piece 23 molded in the workpiece 6 is punched. In other words, in the contour punching step S60, the radially inner side from the end portion in the radially outer side of the split stator piece portion 63 is punched.

In the split stator piece portion 63, the boundary portion between the extruded portion 63a and the stationary portion 63b reaches the outside of the yoke piece formation region Sa11 and also reaches the center hole 61. The boundary portion between the extruded portion 63a and the stationary portion 63b is formed by deformation through the split stator piece portion molding step S30 and the pushback step S40. Thereby, the stator piece 230 having a boundary between the split stator pieces 23 adjacent to each other is manufactured. Both the extruded portion 63a and the stationary portion 63b are surrounded by the outer end portion of the yoke piece formation region Sa11, the boundary between the extruded portion 63a and the stationary portion 63b, and the inner end portion of the tooth piece formation region Sa12. In other words, the extruded portion 63a and the stationary portion 63b become the split stator piece portions 63 having the same shape. Note that the split stator piece portion 63 formed of the extruded portion 63a and the split stator piece portion 63 formed of the stationary portion 63b may have different shapes.

<2.7 Lamination Step>

Figure 15:
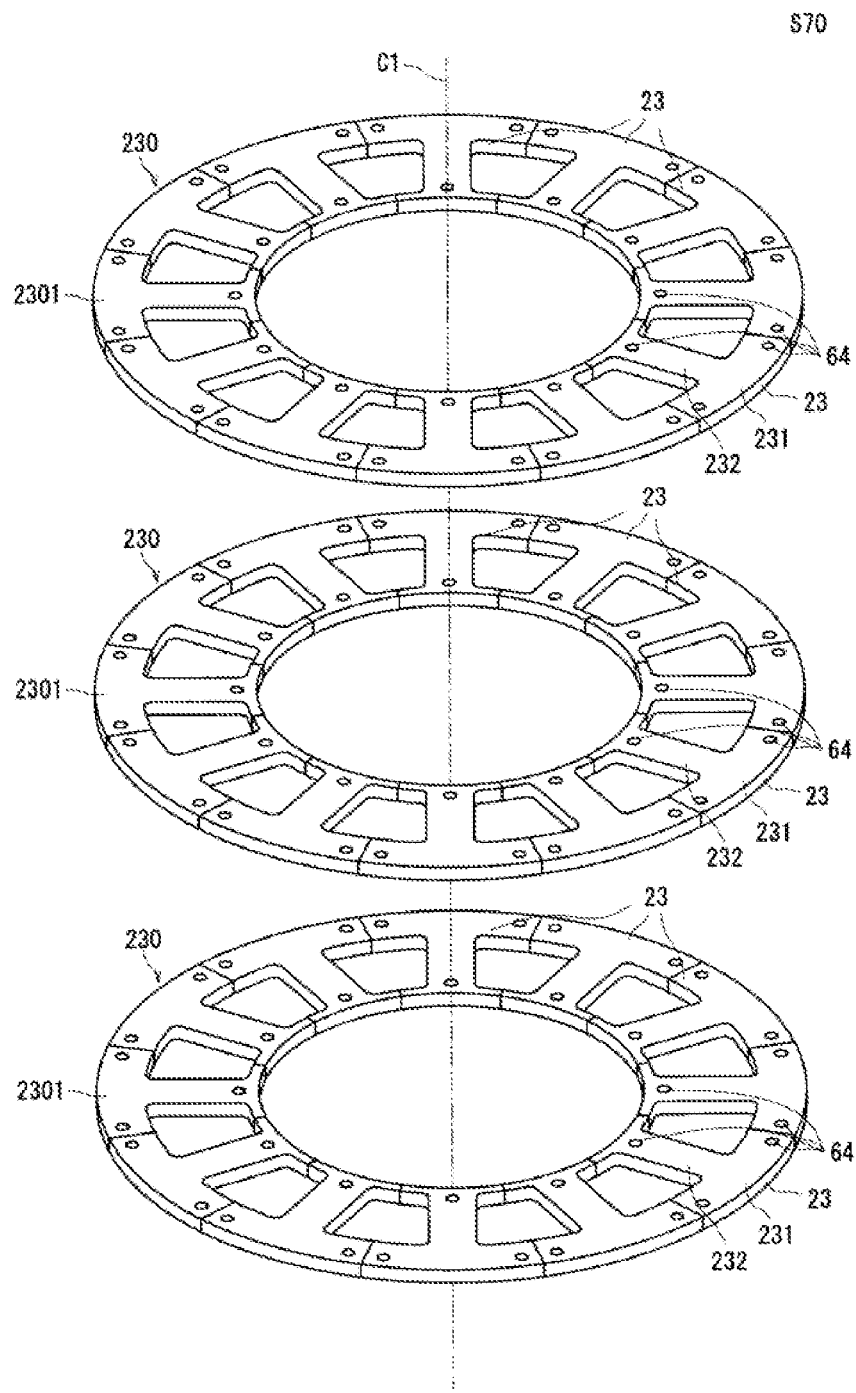
FIG. 15 is a diagram showing a part of the lamination step.

FIG. 15 is a diagram showing a part of the lamination step. As shown in FIG. 15, the lamination step S70 is a step of laminating the stator pieces 230 molded in the contour punching step. In the lamination step S70, the stator piece 230 is stacked on the one side in the axial direction of the stator piece 230. That is, the lamination direction in the lamination step S70 is the axial direction. At this time, the split stator pieces 23 are stacked so that the protruding portion 641 of the caulking portion 64 of the split stator piece 23 fits into the recessed hole 642 of the split stator piece 23 laminated on the one side in the axial direction. As a result, the split stator pieces 23 are laminated in the axial direction (see FIG. 2). That is, in the lamination step S70, the split yoke piece 231 and the tooth piece 232 are laminated in the axial direction and connected. In addition, the lamination step S70 includes a caulking step using the caulking portion 64.

The laminated body laminated in the lamination step has the same shape as that of the stator core 21 held by the housing 3. As described above, since the boundary between the adjacent split stator pieces 23 is weaker than the other portions, the boundary between the split stator pieces 23 is separated by applying a force to the split stator 210. That is, the stator core 21 can be split into the split stators 210. For example, although omitted in the present embodiment, the tooth 212 of the stator core 21 is covered with an insulator, and the coil 22 is formed by being wound with a conductive wire over the insulator. When the coil is formed, the workability is higher if the stator core 21 is split into the split stators 210. In the split stator 210, the split stator piece 23 is fixed to the adjacent split stator pieces 23 by laser welding, for example. Therefore, even if the stator core 21 is split into the split stators 210, the split stator 210 is not separated into the split stator pieces 23.

As described above, by using the laminated core manufacturing method according to the present invention, residual stress and residual strain due to bending or the like are unlikely to occur. Accordingly, the adjustment range of the place where the caulking portion 64 is formed is widened, and it is easy to manufacture the stator core 21 having desired magnetic characteristics. In addition, since residual stress and residual strain hardly occur, it is possible to suppress adverse effects on the flow of magnetic flux that may be caused by these factors. From these grounds, it is also possible to manufacture the stator core 21 having desired magnetic characteristics. In addition, since heat treatment or the like for removing residual stress and residual strain is unnecessary, time and labor required for manufacturing the laminated core can be saved. Further, since a bending step is unnecessary, the surface of the tool to be in contact with the workpiece 6 is flat. Therefore, it is easy to manufacture and maintain the tool. From these points of view, it is also possible to reduce the labor and time required for manufacturing the laminated core.

Modification 1 of First Embodiment

Figure 16:
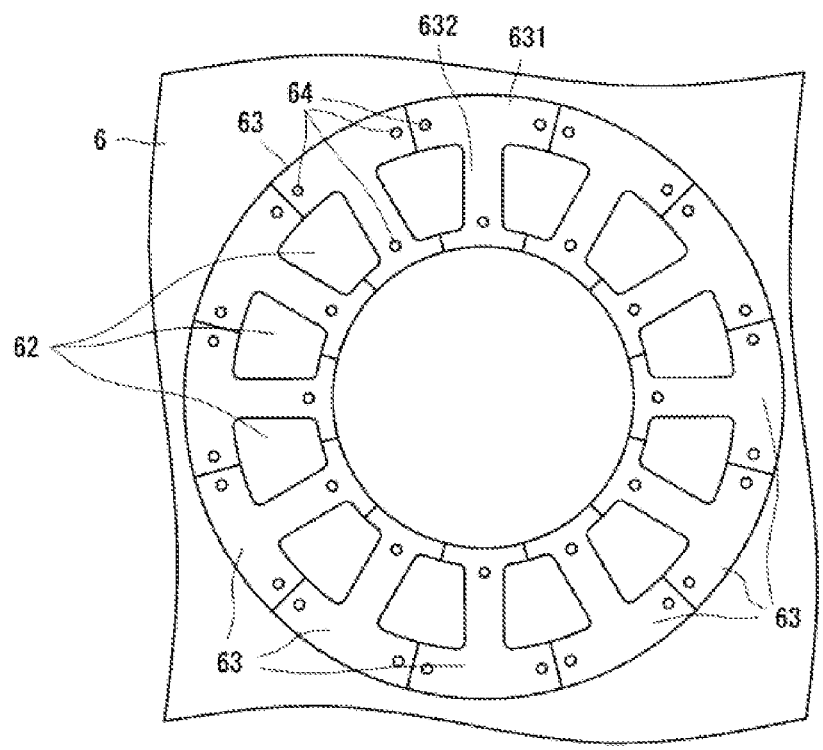
FIG. 16 is a diagram showing a workpiece after performing a split stator piece portion molding step and a pushback step in another example of a laminated core manufacturing method according to the present embodiment.

A modification of the present embodiment will be described with reference to the drawings. FIG. 16 is a diagram showing a workpiece after performing the split stator piece portion molding step and the pushback step in another example of a laminated core manufacturing method for the present embodiment. In the workpiece 6 shown in FIG. 16, in the split stator piece portion molding step S30, all of the split stator piece portions 63 aligned in the circumferential direction are pushed by the tool Ms1 and all of the extruded split stator piece portions 63 are pushed back in the pushback step S40. That is, in the split stator piece portion molding step S30, each of the predetermined number of split stator piece portions 63 arranged in the circumferential direction is extruded.

Since all of the split stator piece portions 63 are extruded, there is no difference in the processing step among the split stator piece portions 63. Thereby, it is possible to suppress variations in the split stator piece portions 63, that is, the split stator pieces 23.

The split stator piece portion molding step and the pushback step will be described. For example, after one split stator piece portion 63 is extruded in the split stator piece portion molding step, the split stator piece portion 63 is pushed back in the pushback step. Similarly, an adjacent split stator piece portion 63 in the circumferential direction is molded. As described above, all of the split stator piece portions 63 arranged in the circumferential direction may be molded. By molding them in this way, even in the case where the stator core 21 is formed of an odd number of split stators 210, for example, it is possible to employ the method according to this embodiment.

Modification 2 of First Embodiment

Figure 17:
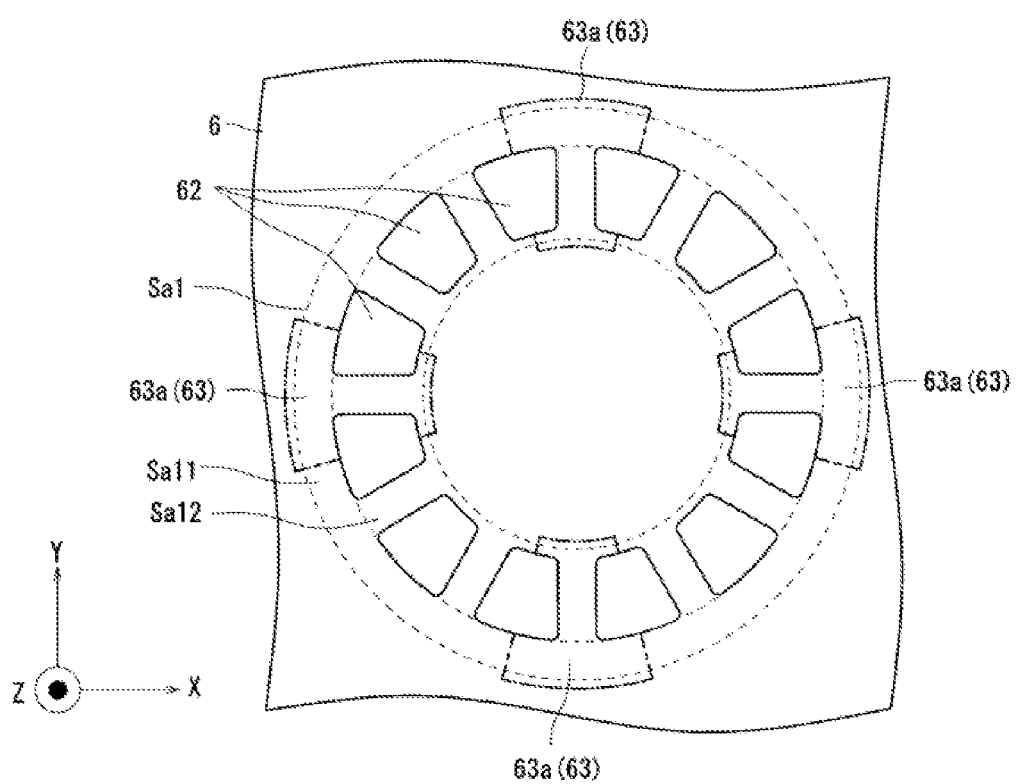
FIG. 17 is a diagram showing a workpiece after performing a split stator piece portion molding step and a pushback step in another example of a laminated core manufacturing method according to the present embodiment.
Figure 18:
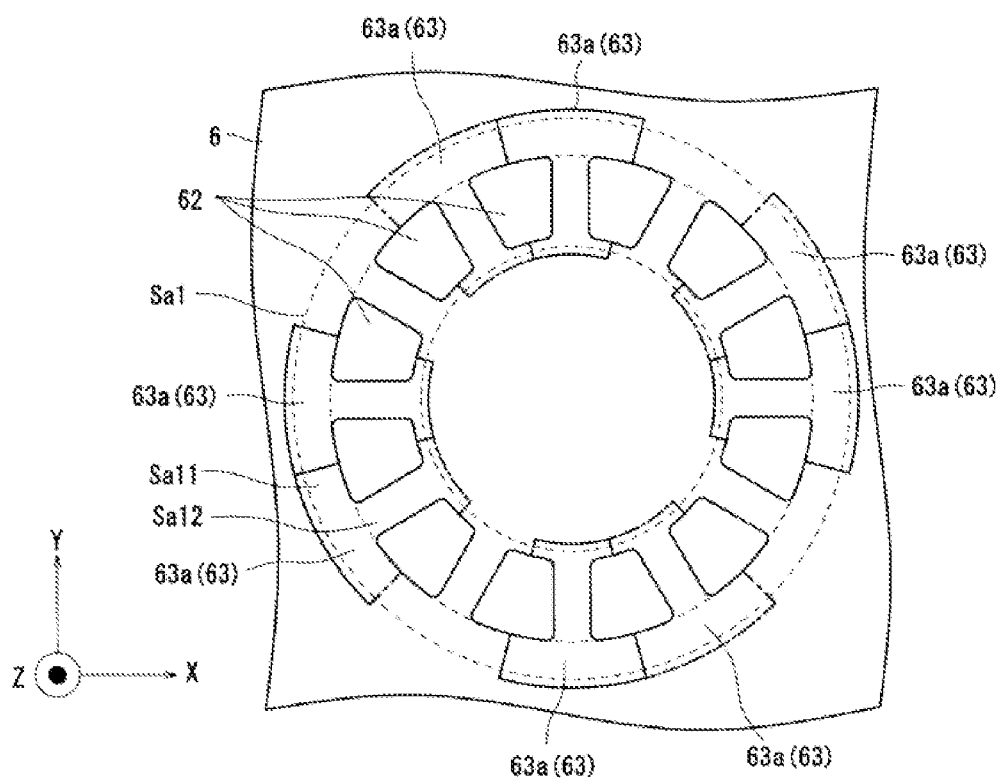
FIG. 18 is a diagram showing a workpiece after performing a split stator piece portion molding step and a pushback step in another example of a laminated core manufacturing method according to the present embodiment.

A modification of the present embodiment will be described with reference to the drawings. FIGS. 17 and 18 are diagrams each showing a workpiece after performing the split stator piece portion molding step and the pushback step in another example of a laminated core manufacturing method for the present embodiment. In the workpiece 6 shown in FIG. 17, in the split stator piece portion molding step S30, four extruded portions 63a arranged at symmetrical positions across the center, out of the split stator piece portions 63 aligned in the circumferential direction, are simultaneously extruded and are pushed back to the original positions. Then, as shown in FIG. 18, four extruded portions 63a circumferentially adjacent to the four split stator piece portions 63 respectively are simultaneously extruded and are pushed back to the original positions. In this way, it is possible to shorten the operation time by extruding a plurality of pieces at a time and pushing back them.

In this embodiment, the four extruded portions 63a are simultaneously molded, but the present invention is not limited thereto. It is not limited to four as long as it is a submultiple of the total number of the split stator piece portions 63. For example, in the present embodiment, there are twelve split stator piece portions 63. Therefore, three extruded portions 63a may be molded at the same time.

Modification 3 of First Embodiment

Figure 19:
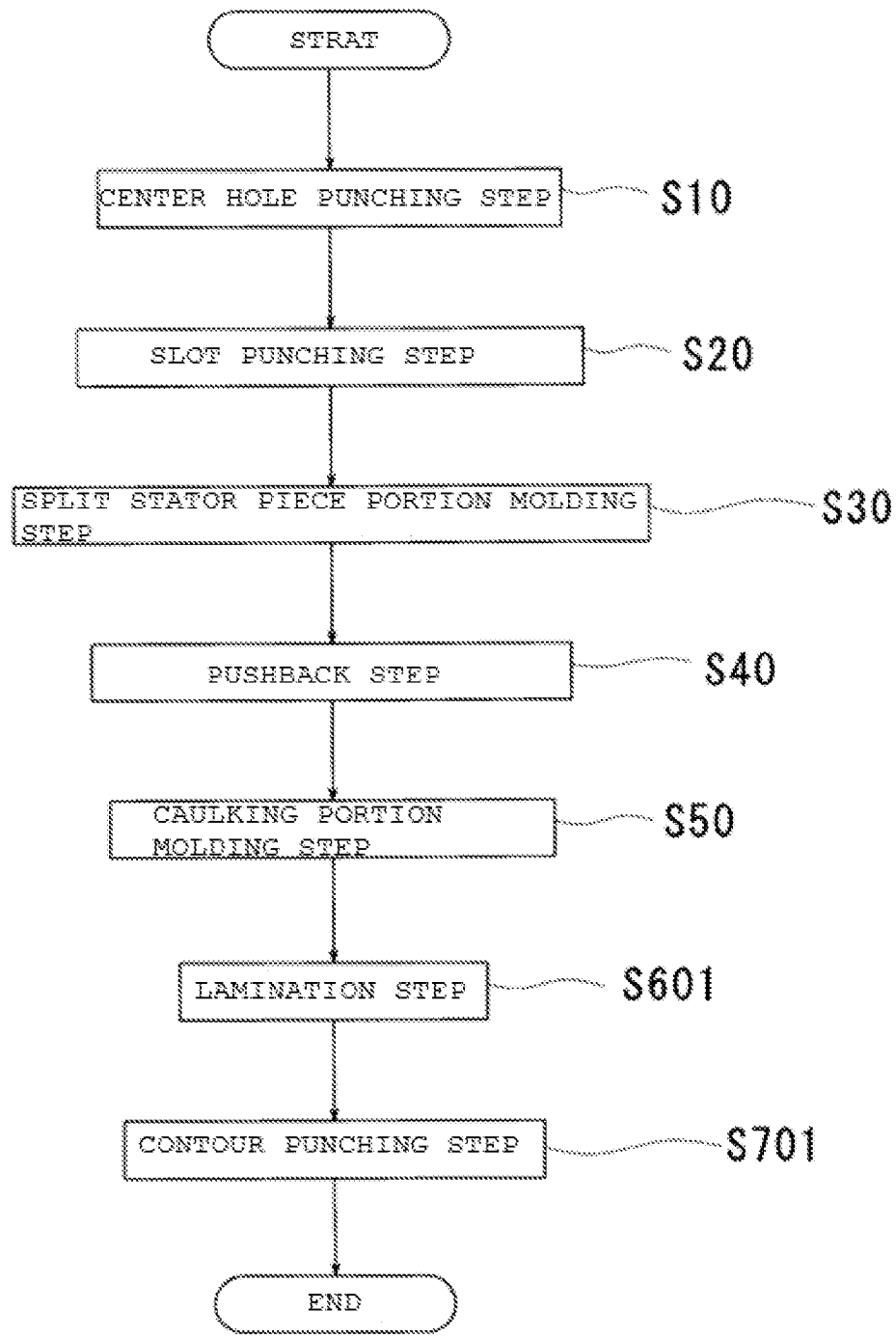
FIG. 19 is a flowchart of a laminated core manufacturing process shown in the present modification.
Figure 20:
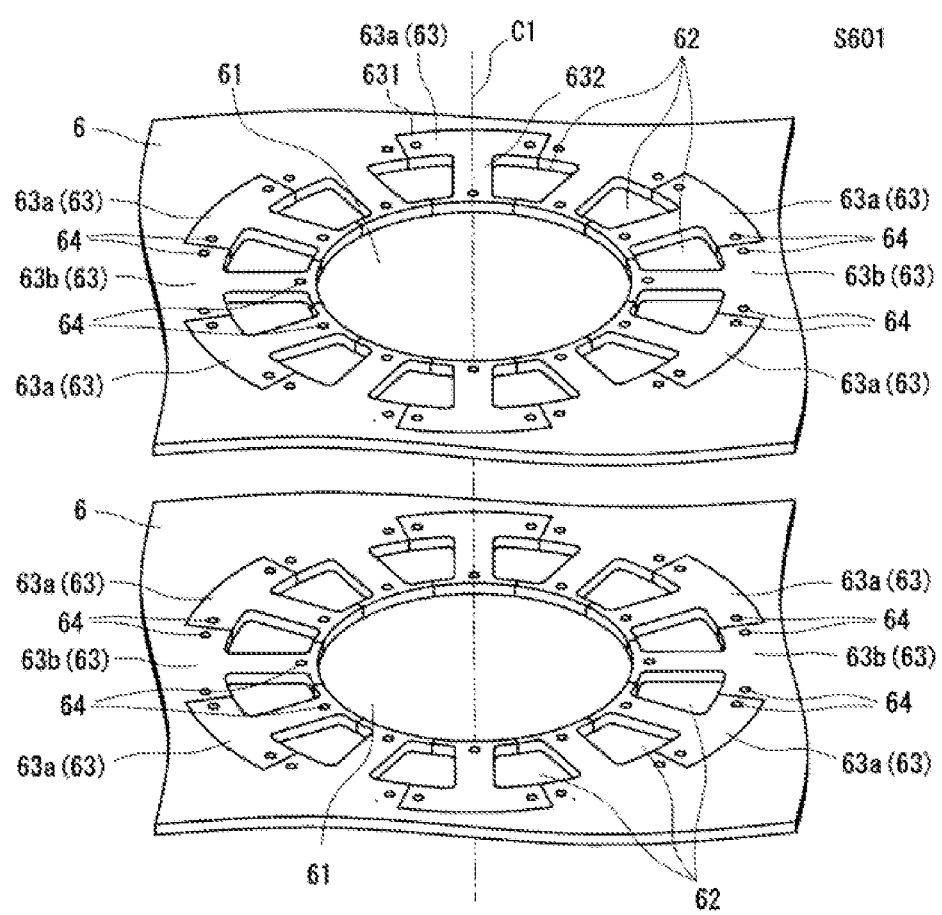
FIG. 20 is a diagram showing a part of the lamination step of the flowchart shown in FIG. 19.
Figure 21:
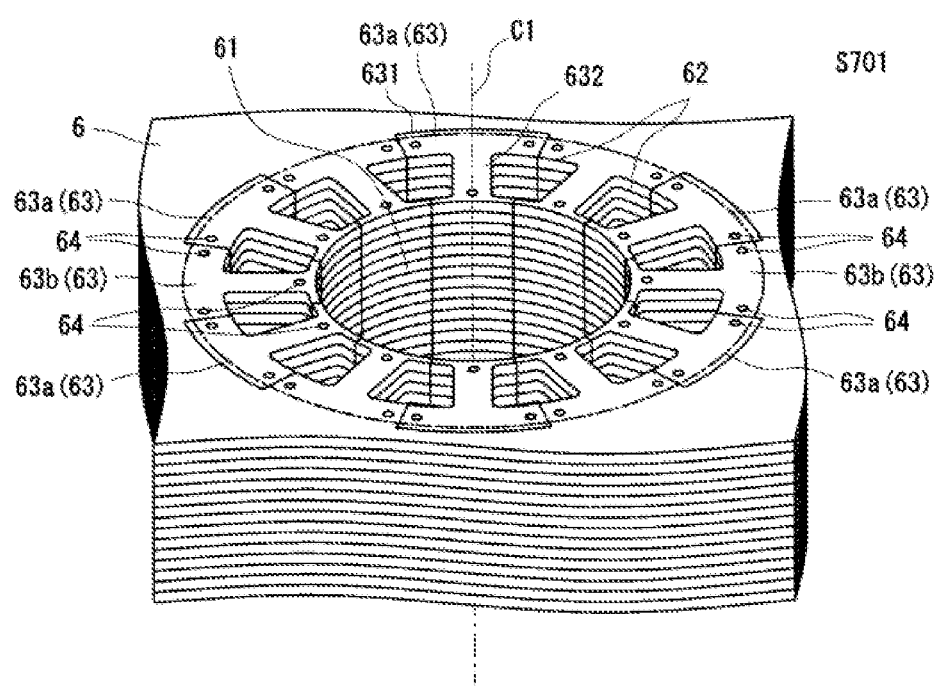
FIG. 21 is a diagram showing a part of the lamination step of the flowchart shown in FIG. 19.

A modification of the present embodiment will be described with reference to the drawings. FIG. 19 is a flowchart of a laminated core manufacturing process shown in the present modification. FIG. 20 is a diagram showing a part of the lamination step of the flowchart shown in FIG. 19. FIG. 21 is a diagram showing a part of the lamination step of the flowchart shown in FIG. 19.

As shown in FIG. 19, in the laminated core manufacturing process of the present embodiment, the order of a lamination step S601 and a contour punching step S701 are reversed with respect to the flowchart shown in FIG. 4. The other parts are the same as those of the flowchart shown in FIG. 4, and the detailed description of substantially the same parts will be omitted.

As shown in FIG. 20, after the caulking portion 64 is molded in the caulking portion molding step S50, the caulking portion 64 is laminated for each workpiece 6 (lamination step S601). The split stator piece portions 63 are fixed by the caulking portions 64 to each other and laminated in the axial direction. Then, as shown in FIG. 21, the contour of the stator core 21 of the workpiece 6 laminated in the lamination step S601 is punched out in the axial direction (contour punching step S701). That is, in the contour punching step S701, after lamination in the lamination step S601, the contour of the portion to be the stator piece 230 of the entire laminated body is punched out in the lamination direction.

In this way, by laminating the workpiece 6 before forming the stator piece, it is possible to perform the contour punching step S701 only once. In addition, deformation may occur somewhat by the contour punching step. The caulking portion 64 may be displaced depending on the location of deformation. By performing the lamination step S601 before the contour punching step S701, it is possible to suppress the influence of the displacement of the caulking portion 64 by the contour punching step.

Modification 4 of First Embodiment

In the split stator piece portion molding step S30 and the pushback step S40 shown in FIG. 4, residual stress and residual strain hardly occur in the split stator piece portion 63. Therefore, the caulking portion molding step may be performed before the split stator piece portion molding step S30.

As described above, by performing the caulking portion molding step before the split stator piece portion molding step, since the split stator piece portion 63 is not formed at the time of molding the caulking portion 64, it is possible to suppress deterioration of accuracy of the shape and position of the caulking portion 64 due to movement and deviation of the split stator piece portion 63. In the split stator piece portion molding step, a tool for extruding the extruded portion 63a may have a configuration to avoid the caulking portion 64 such as a recessed portion in a portion overlapping the caulking portion 64. With such a configuration, deformation of the caulking portion 64 can be suppressed. In addition, when the extruded portion 63a is extruded, the caulking portion 64 may be formed at the same time.

3. Second Embodiment

Figure 22:
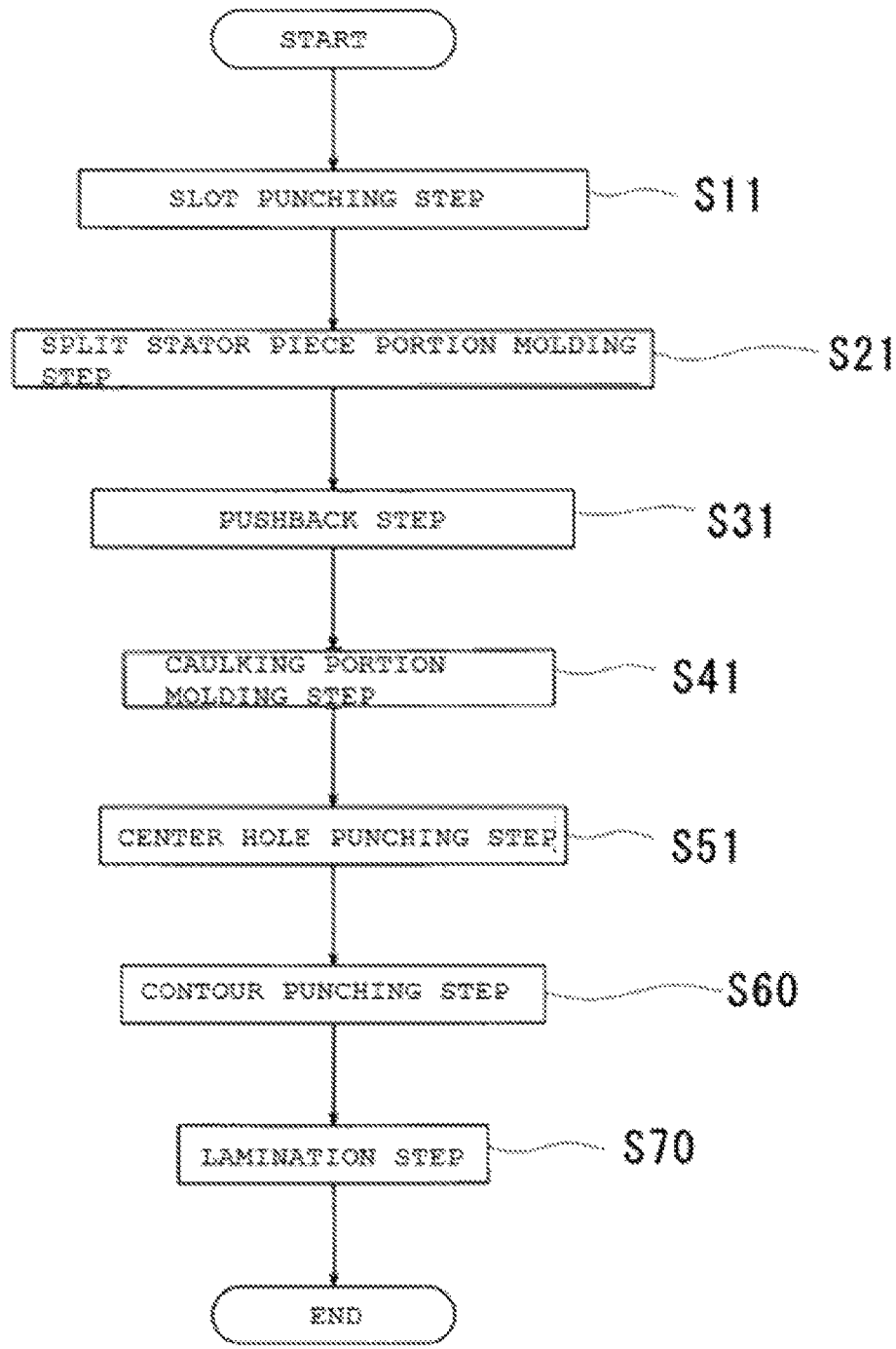
FIG. 22 is a flowchart showing a laminated core manufacturing method according to a second embodiment of the present invention as an example.

A laminated core manufacturing method according to a second embodiment of the present invention as an example will be described with reference to the drawings. FIG. 22 is a flowchart showing a laminated core manufacturing method according to the second embodiment of the present invention as an example. FIGS. 23 to 26 are diagrams each showing a part of each step in the method for manufacturing a motor shown in FIG. 22. In the second embodiment, a center hole punching step is included after the pushback step.

Figure 23:
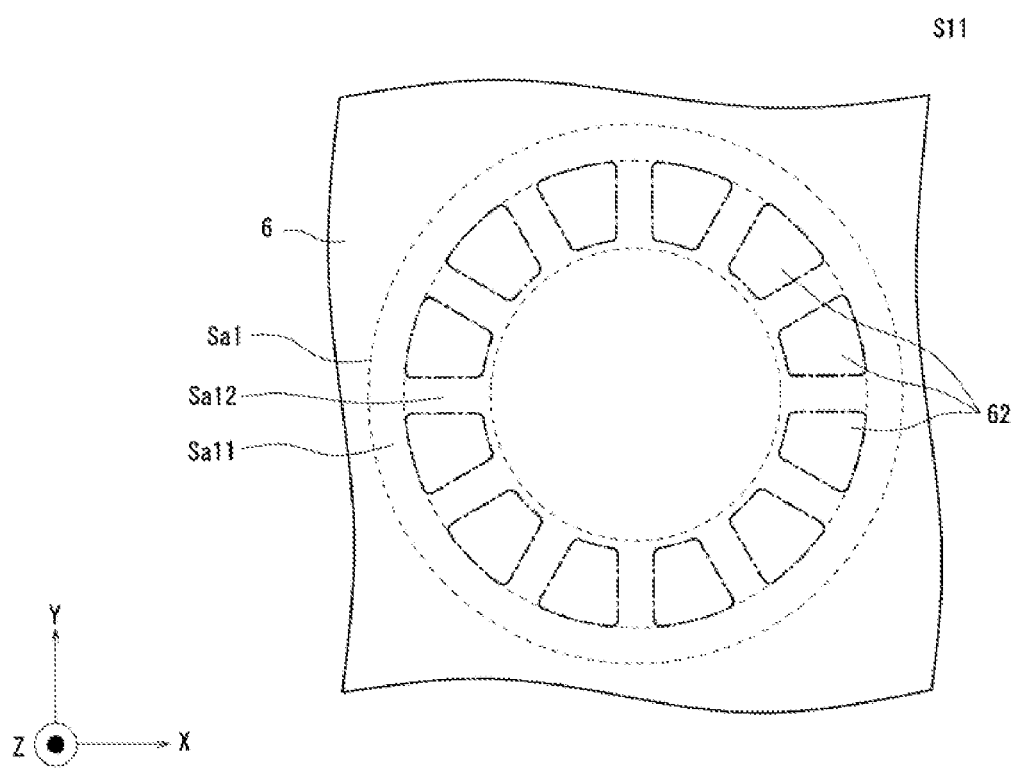
FIG. 23 is a diagram showing a part of the slot punching step in the laminated core manufacturing method shown in FIG. 22.
Figure 24:
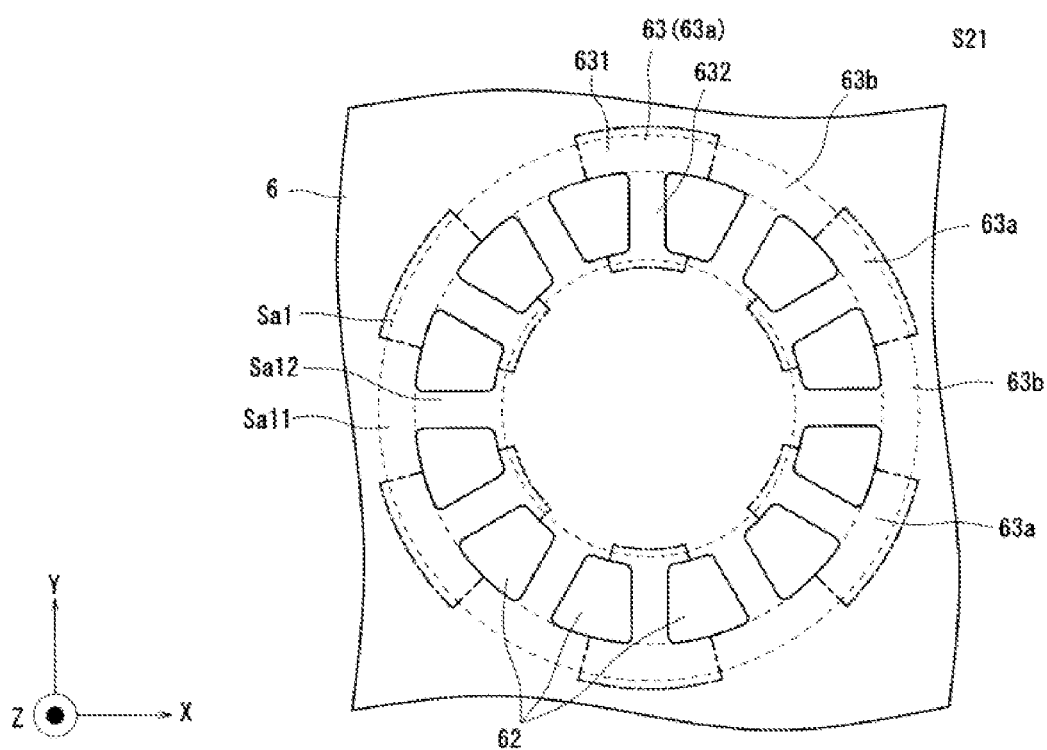
FIG. 24 is a diagram showing a part of a split stator piece portion molding step of the laminated core manufacturing method shown in FIG. 22.
Figure 25:
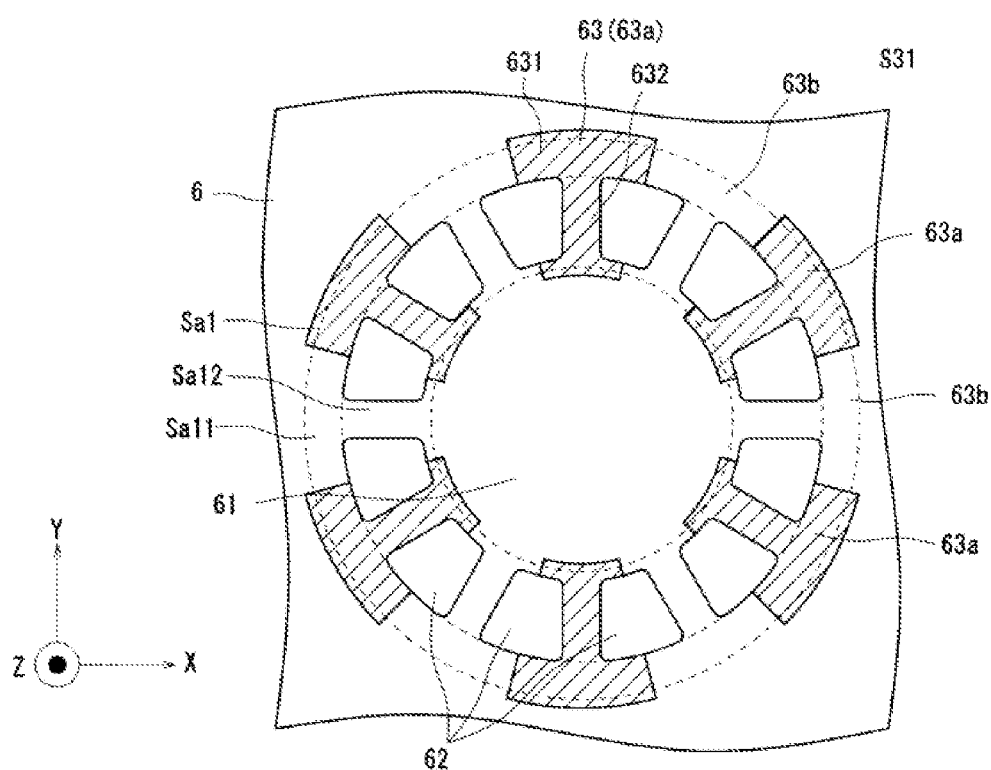
FIG. 25 is a diagram showing a part of the pushback step of the laminated core manufacturing method shown in FIG. 22.

FIG. 23 is shows a part of the slot punching step of the laminated core manufacturing method shown in FIG. 22. As shown in FIGS. 22 and 23, in the laminated core manufacturing method for the second embodiment, the slot 62 is punched at a predetermined position of the workpiece 6 (slot punching step S11). FIG. 24 shows a part of the split stator piece portion molding step of the laminated core manufacturing method shown in FIG. 22. After punching the slot 62, the split stator piece portion 63 is molded (split stator piece portion molding step S21) as shown in FIG. 24. Similar to FIG. 7, the split stator piece portion 63 has an extruded portion 63a and a stationary portion 63b. FIG. 25 shows a part of the pushback step of the laminated core manufacturing method shown in FIG. 22. Then, as shown in FIG. 25, the extruded portion 63a is pushed back to the original position (pushback step S31).

Figure 26:
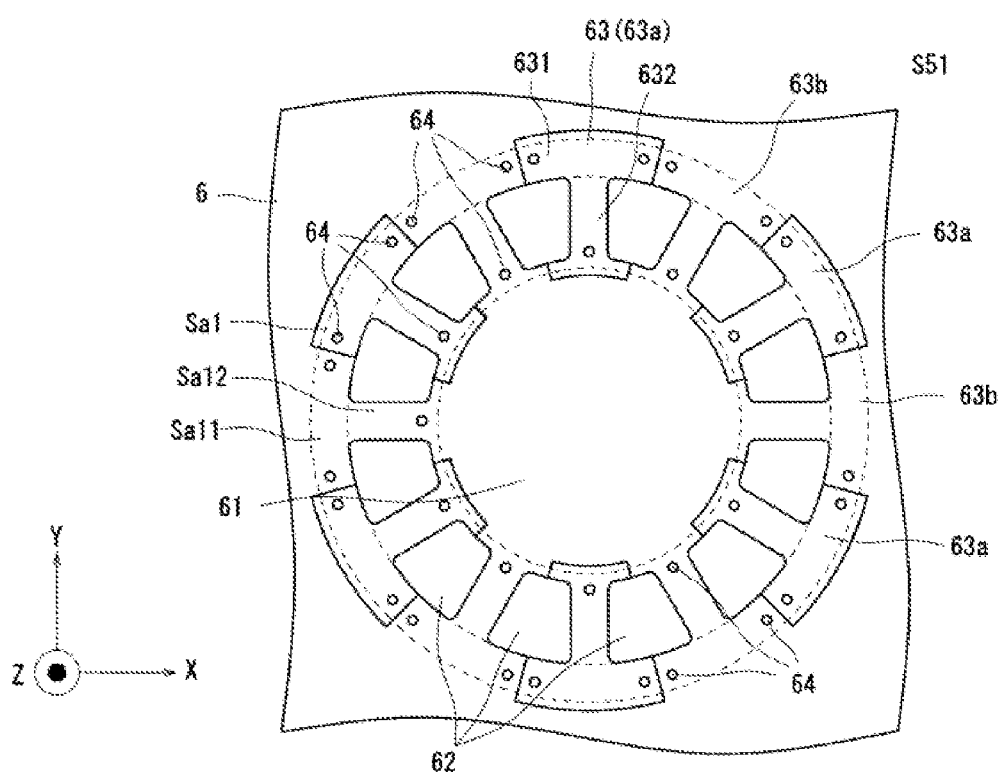
FIG. 26 is a diagram showing a part of the caulking portion molding step of the laminated core manufacturing method shown in FIG. 22.
Figure 27:
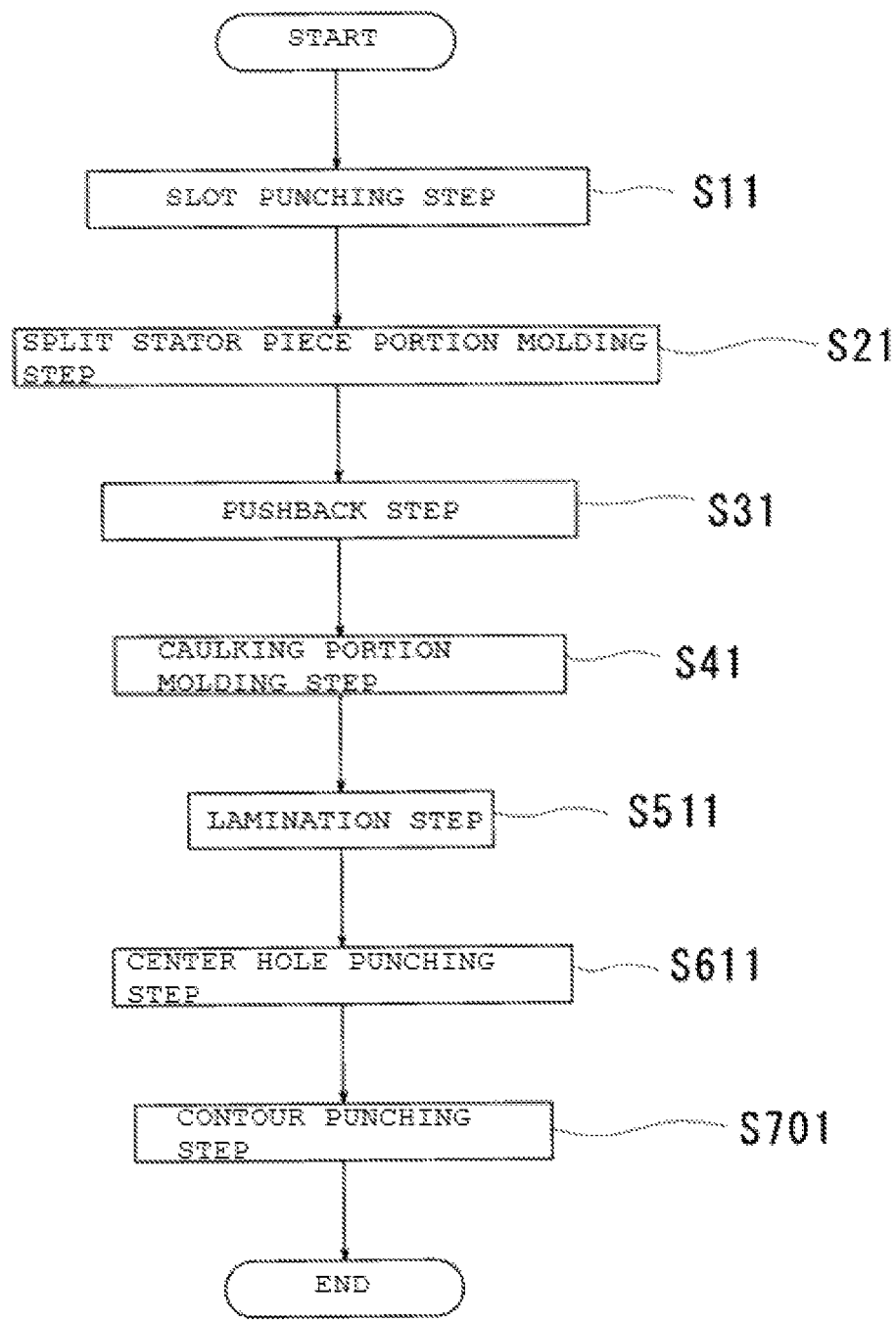
FIG. 27 is a flowchart of a laminated core manufacturing process shown in the present modification.

FIG. 26 shows a part of the caulking portion molding step of the laminated core manufacturing method shown in FIG. 22. Thereafter, as shown in FIG. 26, the caulking portion 64 is molded at a predetermined position of the split stator piece portion 63 (caulking portion molding step S41). Then, as shown in FIG. 27, after molding the caulking portion 64, the center hole 61 is punched out (center hole punching step S51).

After punching the center hole 61, the contour punching step S60 is performed. After this step, the procedure is the same as that of the laminated core manufacturing method shown in FIG. 4.

In the laminated core manufacturing process of the second embodiment, the center hole 61 is punched after molding of the split stator piece portions 63 including the caulking portions 64 is completed. At that time, the center hole 61 is punched out with the outer diameter that is the same as the radially inner side of the tooth piece formation region Sa12. That is, by performing the center hole punching step S51 after molding the split stator piece portions 63, it is possible to punch the end portion on the inner side of the split stator piece portion 63 only once. This makes it possible to reduce the number of steps in the manufacturing process.

Modification 1 of Second Embodiment

The lamination step S601 of the laminated core manufacturing method shown in FIG. 19 may be performed after the center hole 61 is punched in the center hole punching step S51. By proceeding to the lamination step S601, it is possible to laminate the split stator pieces 63 accurately and stably.

Modification 2 of Second Embodiment

A modification of the present embodiment will be described with reference to the drawings. FIG. 27 is a flowchart of a laminated core manufacturing process shown in this modification. The laminated core manufacturing process shown in FIG. 27 includes a lamination step S511 of laminating the workpiece 6, and a center hole punching step S611 of punching the center hole 61 of the laminated workpiece 6 in the axial direction, after the caulking portion molding step S41. That is, in the center hole punching step S611, after the lamination is performed in the lamination step S511, the center hole of the entire laminated body is punched in the lamination direction. Then, after the center hole punching step S611, the contour punching step S701 shown in FIG. 19 is performed.

Figure 28:
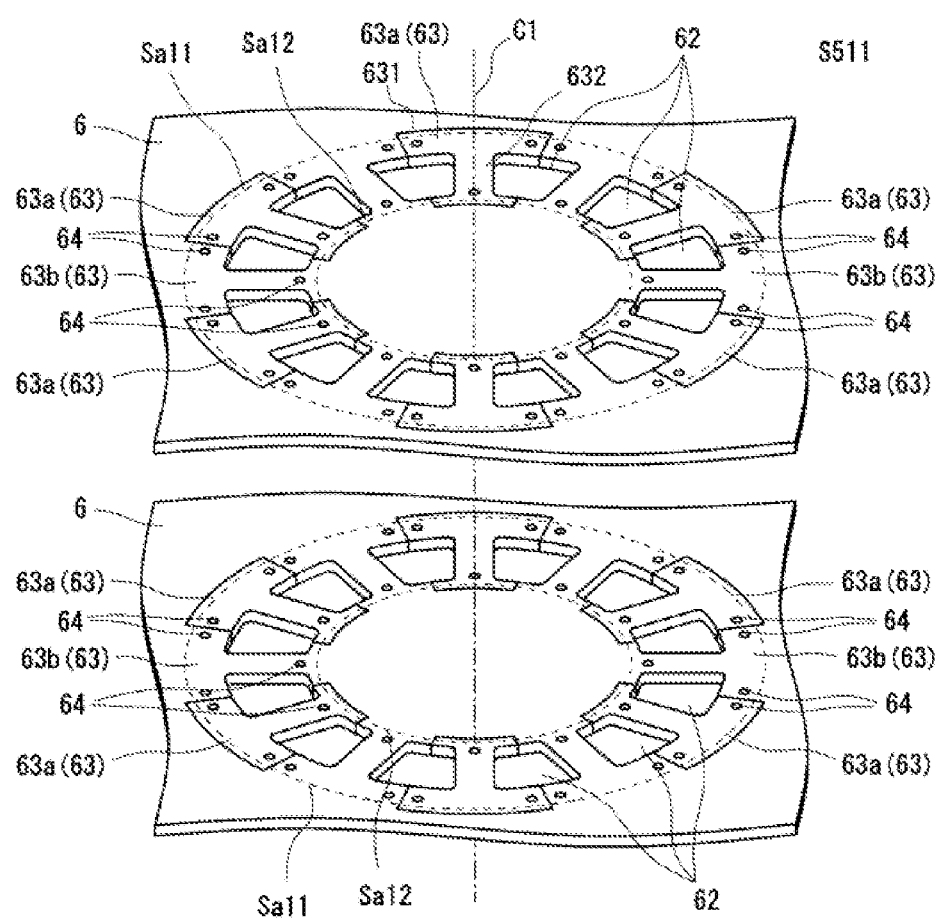
FIG. 28 is a diagram showing a part of the lamination step of the laminated core manufacturing method shown in FIG. 27.
Figure 29:
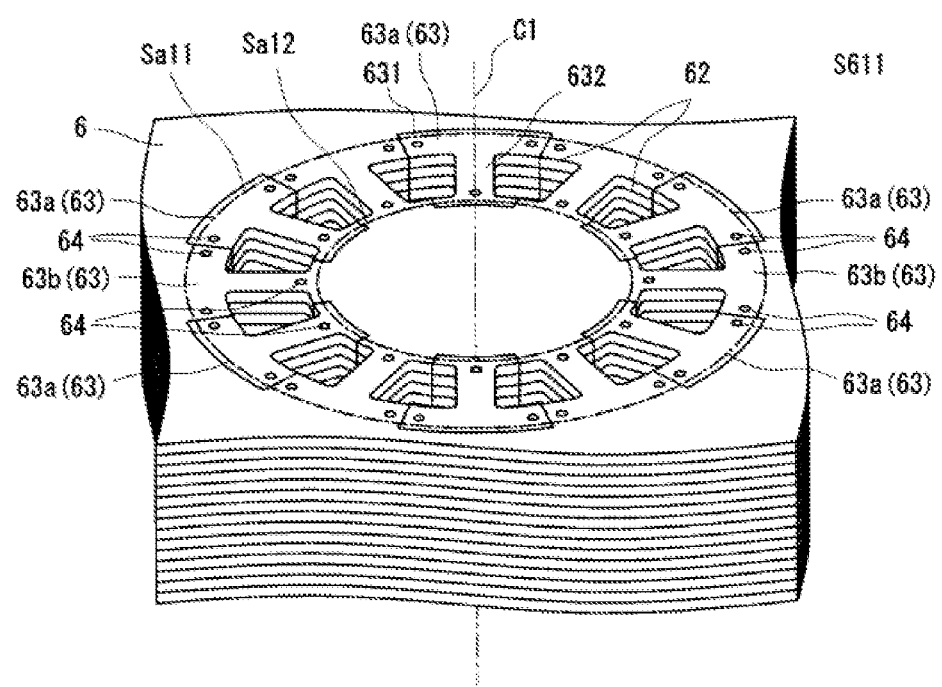
FIG. 29 is a diagram showing a part of the center hole punching step of the laminated core manufacturing method shown in FIG. 27.

FIG. 28 is a diagram showing a part of the lamination step of the laminated core manufacturing method shown in FIG. 27. As shown in FIG. 28, after the caulking portion 64 is molded in the split stator piece portion 63, the workpiece 6 is laminated. FIG. 29 is a diagram showing a part of the center hole punching step in the laminated core manufacturing method shown in FIG. 27. Then, as shown in FIG. 29, the center portion including the center axis of the laminated workpiece 6 is punched (center hole punching step S611). As described above, since the center hole 61 is punched after the workpiece 6 is laminated, variations in the inner peripheral surface of the stator core 21 are suppressed.

As described above, in the laminated core manufacturing method according to the present invention, the split stator piece portion molding step is performed after the slot punching step. Then, the pushback step is performed immediately after the split stator piece portion molding step. The caulking portion molding step is performed before the lamination step.

Since the split stator piece 23 is not bent, the shape of the split stator piece 23 is hardly changed from that at the time of punching. The roundness of the annular yoke piece 2301 can be increased when the split stator pieces 23 are connected in the circumferential direction. Since the split stator pieces 23 are hardly elongated, it is possible to fit and fix the caulking portions to each other at the time of lamination of the split stator pieces 23. As a result, the roundness of the outer circumferential surface of the annular yoke 211 of the stator core 21 in which the split stators 210 having the split stator pieces 23 being laminated are connected in the circumferential direction is increased. Thereby, it is possible to enhance the accuracy when fixing the stator core 21 to the housing 3.

In addition, occurrence of residual stress and residual strain in the split stator piece 23 is suppressed. Thereby, the flow of the magnetic flux in the split stator piece 23 hardly changes. In addition, deformation and misalignment of the caulking portion 64 due to residual stress and residual strain hardly occur, so that the degree of freedom of arrangement of the caulking portion 64 is increased. As a result, it is possible to form the caulking portion 64 at a position where the flow of the magnetic flux is not disturbed or is less likely to be disturbed. From these facts, it is possible to suppress variations in the magnetic characteristics of the stator core 21.

Furthermore, the workpiece 6 is pressed by a planar tool (blade) to form the split stator piece portion 63. Therefore, it is easy to mold and maintain the tool.

The present invention is applicable to manufacturing of a stator core used for, for example, a brushless motor.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A laminated core manufacturing method for producing a stator core including a predetermined number of split stator pieces, each of the split stator pieces including a split yoke piece and a tooth piece, a plurality of the split yoke pieces defining an annular yoke piece when connected in a circumferential direction of a center axis, the tooth piece being made of a material that is same as a material of the split yoke piece and being formed continuously from the split yoke piece and extending radially inward of the yoke piece, the predetermined number of the split stator pieces are connected endlessly in the circumferential direction and are laminated in an axial direction, the method comprising:
punching a center hole including the center axis from a center portion of a processing region provided in a workpiece, the processing region including a yoke piece formation region in which the yoke piece is formed and a tooth piece formation region in which the tooth piece is formed;
extruding the yoke piece formation region and the tooth piece formation region in a thickness direction of the workpiece in a shape that is same as a shape of the split stator piece, and molding split stator piece portions adjacently in the circumferential direction around the center axis;
pushing back and molding the split stator piece portions extruded;
punching a contour of a portion that is molded in the workpiece and becomes the stator piece; and
laminating, in the axial direction, and connecting the split yoke pieces and the tooth pieces; wherein
in the molding the split stator piece portions, the split stator piece portions are extruded in parallel with the workpiece.

2. The laminated core manufacturing method according to claim 1, wherein in the molding the split stator piece portions, two or more of the split stator piece portions are extruded simultaneously.

3. The laminated core manufacturing method according to claim 1, wherein in the molding the split stator piece portions, each of the split stator piece portions arranged in the circumferential direction is extruded.

4. The laminated core manufacturing method according to claim 1, wherein
a number of the split stator piece portions formed in the molding the split stator piece portions is an even number; and
in the molding the split stator piece portions, the split stator piece portions arranged in the circumferential direction are alternately extruded.

5. The laminated core manufacturing method according to claim 1, further comprising punching slots adjacent to each other in a circumferential direction of the tooth piece portion in the tooth piece formation region, wherein
the punching the slots is performed before the molding the split stator piece portions.

6. The laminated core manufacturing method according to claim 1, wherein the punching the center hole punching includes punching a piece of a rotor core to be disposed rotatably inside the stator core.

7. The laminated core manufacturing method according to claim 1, wherein in the punching the center hole, the center hole of an entire laminated body is punched in a lamination direction after the lamination is performed in the lamination step.

8. The laminated core manufacturing method according to claim 1, wherein in the punching the contour, the contour of the portion that becomes the stator piece of an entire laminated body is punched in the lamination direction after the lamination is performed in the lamination step.

9. The laminated core manufacturing method according to claim 1, wherein in the punching the contour, a radially inner side from an end portion of a radially outer side of the split stator piece portion is punched.

10. The laminated core manufacturing method according to claim 1, wherein in the molding the split stator piece portions or in the pushing back, the split stator piece portion is separated from the workpiece.

11. The laminated core manufacturing method according to claim 1, further comprising forming a caulking portion for caulking in at least one of a split yoke piece portion and a tooth portion of the split stator piece portion, wherein
the forming the caulking portion is performed before the laminating; and
the laminating includes performing caulking using the caulking portion.

* * * * *